United States Patent [19]
Choung

[11] Patent Number: 6,105,073
[45] Date of Patent: Aug. 15, 2000

[54] METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY

[75] Inventor: Byung-Mee Choung, Lake Forest, Calif.

[73] Assignee: Unisys Corp., Blue Bell, Pa.

[21] Appl. No.: 08/655,553

[22] Filed: May 30, 1996

[51] Int. Cl.[7] .............................. G06F 15/163; G06F 9/00; G06F 9/46
[52] U.S. Cl. ............................................................ 709/321
[58] Field of Search .................................... 709/300, 303, 709/304

[56] References Cited

U.S. PATENT DOCUMENTS

| | | | |
|---|---|---|---|
| 5,218,699 | 6/1993 | Brandle et al. ........................... | 709/304 |
| 5,430,876 | 7/1995 | Schreiber et al. ....................... | 709/304 |
| 5,838,971 | 11/1998 | Stadler et al. .......................... | 709/304 |
| 5,926,636 | 7/1999 | Lam et al. ............................... | 709/304 |

OTHER PUBLICATIONS

OMG, Meta Object Facility Specification Joint Revised Submission, Sep. 1, 1997, Document ad/97–08–14.

OMG, The Common Object Request Broker: Architecture and Specification Revision 2.0 Jul. 1995, p. 16–1–16–50.

*Primary Examiner*—Alvin E. Oberley
*Assistant Examiner*—Peter Stecher
*Attorney, Agent, or Firm*—J. Ronald Richebourg; Mark T. Starr; Steven B. Samuels

[57] ABSTRACT

The present invention provides a C interface program that remotely operates with an object oriented repository by making the public properties and operations of the types in the repository available to Client programs written in the C language, or accessed via DLLs, or shared objects from other languages. Hence, Client program can execute all the operations on a repository, which is operating on a remotely located Server. The Client program source code can be created on the Server and recompiled on the Client platform without the necessity of making any changes to the code.

31 Claims, 17 Drawing Sheets

METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY

FIELD OF THE INVENTION:

The present invention relates to the field of object-oriented repositories in general, and in particular to a method for interfacing between an object-oriented repository and other programs operating remotely from the repository by use of the Remote Procedure Call ("RPC").

BACKGROUND OF THE INVENTION:

A repository enables the storage and reuse of information about an enterprise. Such information could be definitional (such as programs, files, and the relationships therebetween), management information (e.g., who can see certain types of information, etc.) and operational information (such as schedules, processes, etc.). In an object-oriented repository, this information is stored as objects that have data (e.g., name, salary, etc.) and behavior (e.g., change salary, etc.). The C++ language, with its object-oriented syntax is well suited as an interface to an object-oriented repository.

In the disclosed embodiment of the present invention, the object-oriented repository includes the capability of interfacing with programs also written in the C language. This service is referred to as C Binding and is disclosed in greater detail in a patent by Paul Koerber for A METHOD FOR MAPPING TYPES IN A MODEL IN AN OBJECT-ORIENTED REPOSITORY TO LANGUAGE CONSTRUCTS FOR A C BINDING FOR THE REPOSITORY, U.S. Pat. No. 5,889,992; which application is assigned to the same assignee hereof.

In order to create a more open environment for the repository, it would be beneficial to provide an interoperability service that allows access to a repository on one platform (e.g., functioning as a Server), and a Client application operating on another platform remote from the Server. The Client application can be written in C or any other language that can access C libraries.

BRIEF SUMMARY OF THE INVENTION:

The present invention provides a C interface program that remotely operates with an object oriented repository by making the public properties and operations of the types in the repository available to Client programs written in the C language, or accessed via DLLs, or shared objects from other languages. A Client program written in the C language can execute all the operations on a repository, which is operating on a remotely located Server. The Client program source code can be created on the Server and recompiled on the Client platform without the necessity of making any changes to the code.

The Application Program Interface (API) for C interoperability includes a set of header files that contain the C function numbers to uniquely identify the function calls that a Client program is invoking on the repository. A set of C files on the Client packages the function call including the model name, class number, function number and any parameters needed for the call into an RPC call. Another set of C files on the Server unpackages the information passed by the RPC call, and then calls the appropriate function requested by the Client program.

It is therefore an object of the present invention to provide a well-defined interface to an object-oriented repository on a Server platform for a program written in the C language on a Client platform.

The method of the present invention is useful in a computer system having a Server including a CPU, a memory, and at least one disk drive; and, a Client remotely located from the Server and connected to the Server by an RPC link. The Client includes a CPU, a memory, and at least one disk drive. In the disclosed embodiment of the invention, an exemplary Server is an object-oriented repository. A program running in the computer system executes a method for packing and unpacking C functions to and from, respectively, RPC compatible format using the RPC protocol. The program remotely accesses a model stored in the repository and includes the following steps: for each type in the model, determining if a current one of the types is valid for C binding, and if so; generating function numbers for the current type; generating C Client interface packing functions for the current type; generating C Server interface unpacking functions for the current type; determining if there are more of the types in the model, and if so, repeating the steps above. If there are no more types, then the program continues processing for each data type in the model, determining if a current one of the data types is valid for C binding, and if so; generating function numbers for the current data type; generating C Client interface packing functions for the current data type; generating C Server interface unpacking functions for the current data type; and, determining if there are more data types in the model, and if so, repeating the last three steps hereof. If there are no more data types in the model, the method then generates a function to call the appropriate Server unpacking functions, and thereafter stopping the program after this step.

DETAILED DESCRIPTION

Before proceeding with a detailed description of the method of the present invention a background discussion of object-oriented repositories would be helpful. First the terminology.

The term "interoperability" as used herein refers to the capability of a program on one system to operate with another program on another system. In the disclosed embodiment of this invention, one of the programs is an object-oriented repository and the other program is a C program that uses C API of the repository. The program of this object-oriented repository is made available by Unisys Corporation of Blue Bell, Pa., assignee of this application, under the name of Universal Repository or UREP. The term "packing" refers to translating a C API call into an RPC compatible format ready to be transferred to another system. The term "unpacking" refers to translating the data from an RPC format to a C API call on the Server, or in this embodiment the repository.

Figure 1:
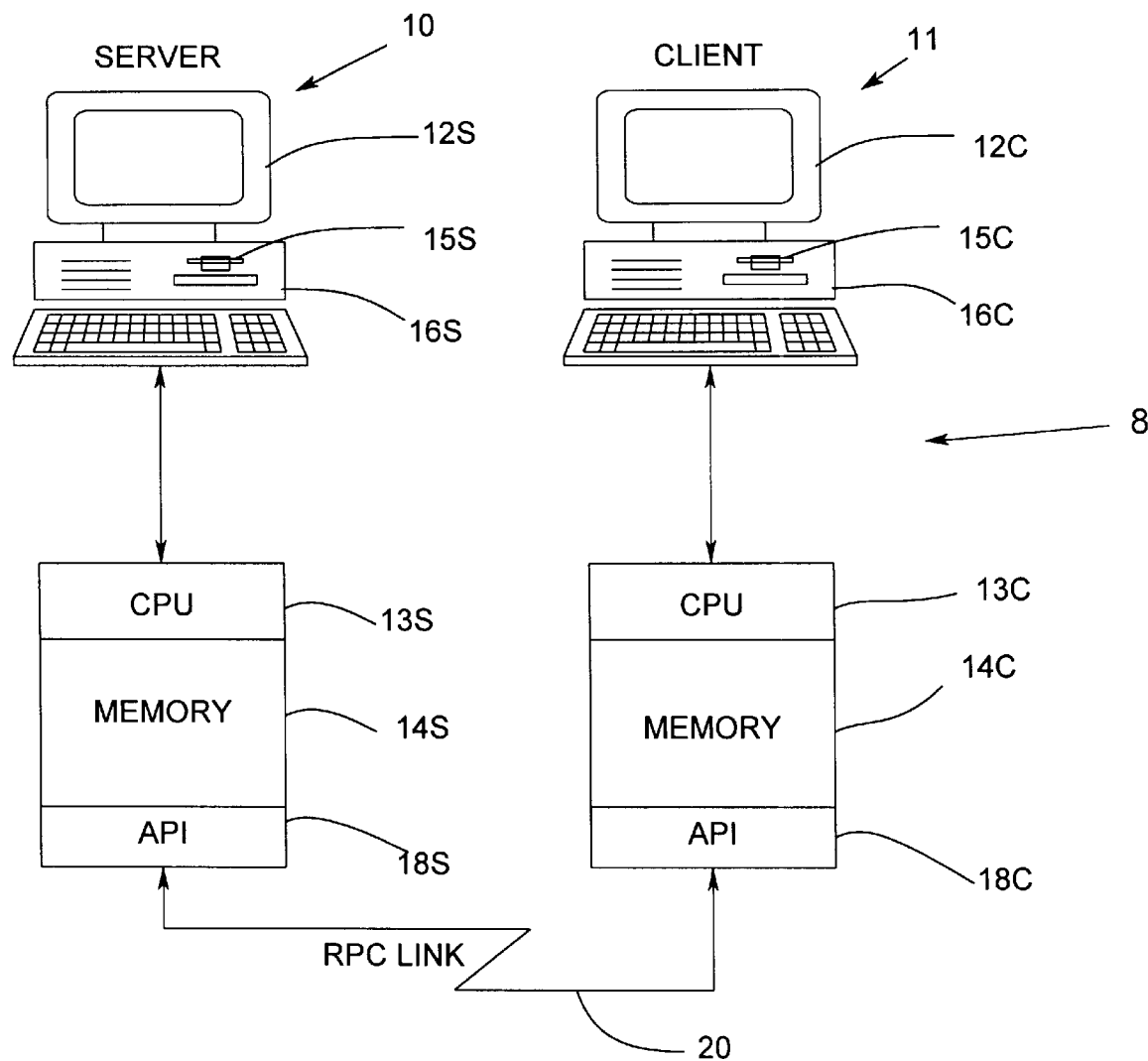
FIG. 1 is a generalized block diagram of a computer system, including a Client and Server that may use the method of the present invention.

Referring now to the drawings and FIG. 1 in particular, a block diagram is shown of a computer system 8 including a Server 10 and a Client 11. Each Server/Client includes an operator console-display 12S/12C, a CPU 13S/13C and a memory 14S/14C. Each Server/Client has access to disk drives 15S-16S or 15C-16C for data storage. Each Server/Client also include an application programming interface ("API") 18S/18C, which interfaces are coupled together by an RPC link 20.

A normal object program stores objects in the computer system's memory 14S/14C. When the program terminates, the memory used by those objects is freed and reused by other programs, making the objects that the program stored transient. An object database stores objects on a computer disk, such as disk drives 15S-16S or 15S-16C. Since the information on a computer disk remains in existence, even when the computer is turned off, an object database provides the ability to persistently store objects. An object program that uses an object database thus has the option of storing objects transiently or persistently.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference.

An attribute defines a value that is stored within the object. For example, "current account balance" could be an attribute of the customer account object. The numeric value for the customer's account balance would be stored in the customer account object. A reference is a link or pointer to another object, and implies a relationship to the other object. A reference is typically used when it is desired not to duplicate data. For example, the customer account object could store the customer's name and address as attributes. But, if the customer opened multiple accounts, the customer's name and address would appear in multiple account objects. Therefore, it is desirable to define a separate customer object and place the name and address as attributes of the customer object. The customer account object would then contain a reference to the customer object.

Figure 2:
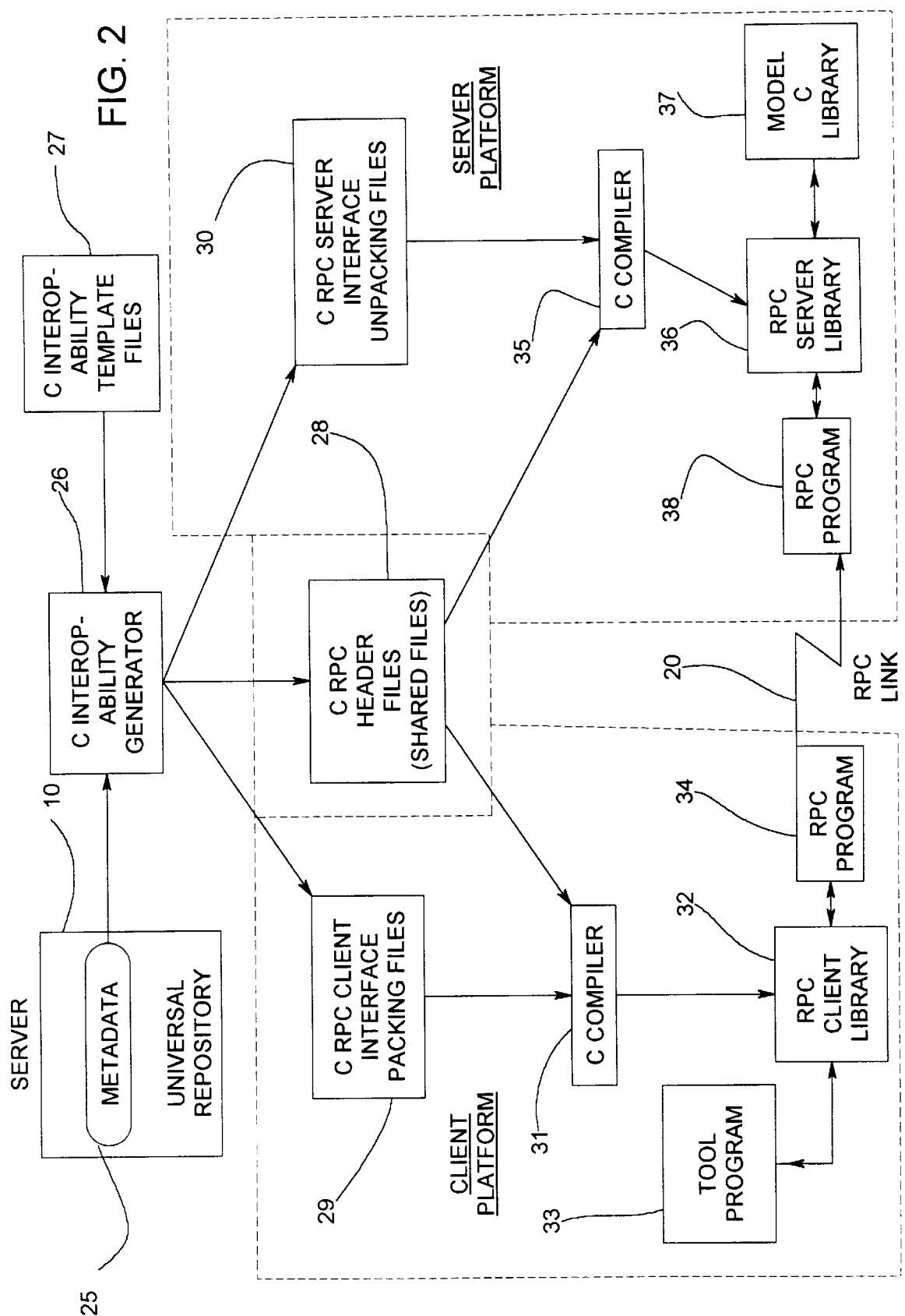
FIG. 2 is a block diagram illustrating interoperability file generation and run-time environment.

With reference to FIG. 2, a block diagram illustrating interoperability file generation and run-time environment. The Server 10, which in the disclosed embodiment is a Universal Repository ("UREP"), includes a metadata service 25 for retrieving information about a model stored in the repository. A model is an abstraction of a real-world concept such as an idea, object or system. Typically, models are used to describe, design and document systems such as a reservation system for an airline, a banking system or a patient-information system for a hospital. Information models represent the information processed or mamaged by enterprises. An information model represents an enterprise as a set of related components, called types, and relationships among the types. The types provide templates defining the structure of the information and the services provided by the model. An exemplary information model used by the present invention defines information that is stored in the object-oriented repository. It also identifies the services provided by the repository and the tool and technology models supported thereby.

Additional detailed information about the metadata service 25 may be had by reference to a pending patent application Ser. No. 08/382,303 also assigned to the assignee of this application and entitled A METHOD FOR SUPPORTING OBJECT MODELING IN A REPOSITORY. A C interoperability file generator 26 is disposed for converting the types, properties and operations defined for a model into RPC interface files.

A C interoperability template files 27 provides an interpreted language used by the generator 26 to produce C RPC header files 28, a C RPC Client interface packing files 29 and a C RPC Server interface unpacking files 30. The generation of the C interoperability files is done on the Server 10 after generation of the C RPC files. Next, the C RPC header files and the C RPC Client interface packing files are transfered to the Client 11. It is pointed out that the header files 28 is shared by both the Server 10 and the Client 11. The packing files 29 and the unpacking files 30 provide an interface between the C functions on the Client 11 to the C functions on the Server 10. A C compiler 31 accepts the C RPC Client interface packing files 29 and the C RPC header files 28 to produce an RPC Client library 32. When a tool program 33 makes a C API call to the object-oriented repository, the RPC Client library 32 intervenes and packages the call to an RPC compatible format and makes a clnt_call function call to an RPC program 34. The term "clnt_call" refers to an RPC supported function that initiates a call to the Server 10.

A C compiler 35 on the Server platform accepts the C RPC Server interface unpacking files 30 and the C RPC header files 28 to produce a RPC Server library 36. An RPC program 38 waits for an RPC request from the Client platform. When it is received, it passes the request to the RPC server library 36 which unpacks the call to a C binding call and executes the requested call to the object-oriented repository via the C Library 37.

Figure 3:
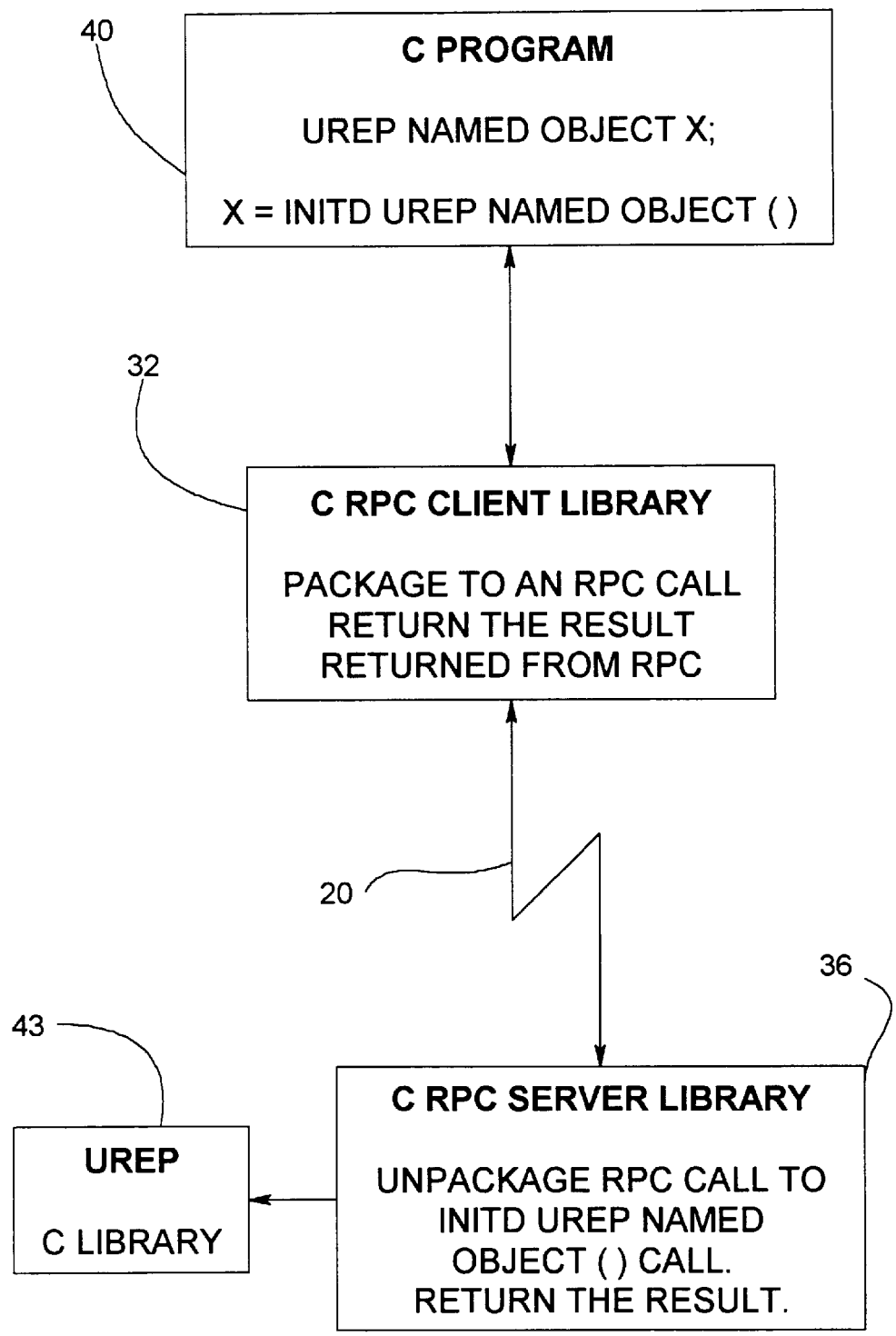
FIG. 3 illustrates an overview of packing and unpacking C API calls to and from RPC.

Referring now to FIG. 3, an overview of the packing and unpacking of an RPC call is illustrated. The C program is graphically depicted by a block 40, wherein a function call, initdUrepNamedObject, is illustrated as creating an instance of the UrepNamedObject type. When the function is called by the C program 40, the C RPC Client library 32 packs the call and sends it to the RPC program 34. The request is sent across the data communication line (RPC link 20) to the Server platform where the call is interpreted by the RPC program 38 on the Server platform. The RPC program 38 passes the request to the C RPC library 36 which unpacks the request into a C binding call (initdUrepNamedObject) and makes the call to the C RPC Server library 36. The initdUrepNamedObject call creates a new instance of the UrepNamedObject type in its memory 14S (FIG. 1). This new instance is added to an object list table maintained by the C binding. The index of this entry into the table is returned to the caller. That is, the result is sent back to the Client via the RPC link 20, and the C RPC Client library 32 returns the result to the C program 40.

Figure 4:
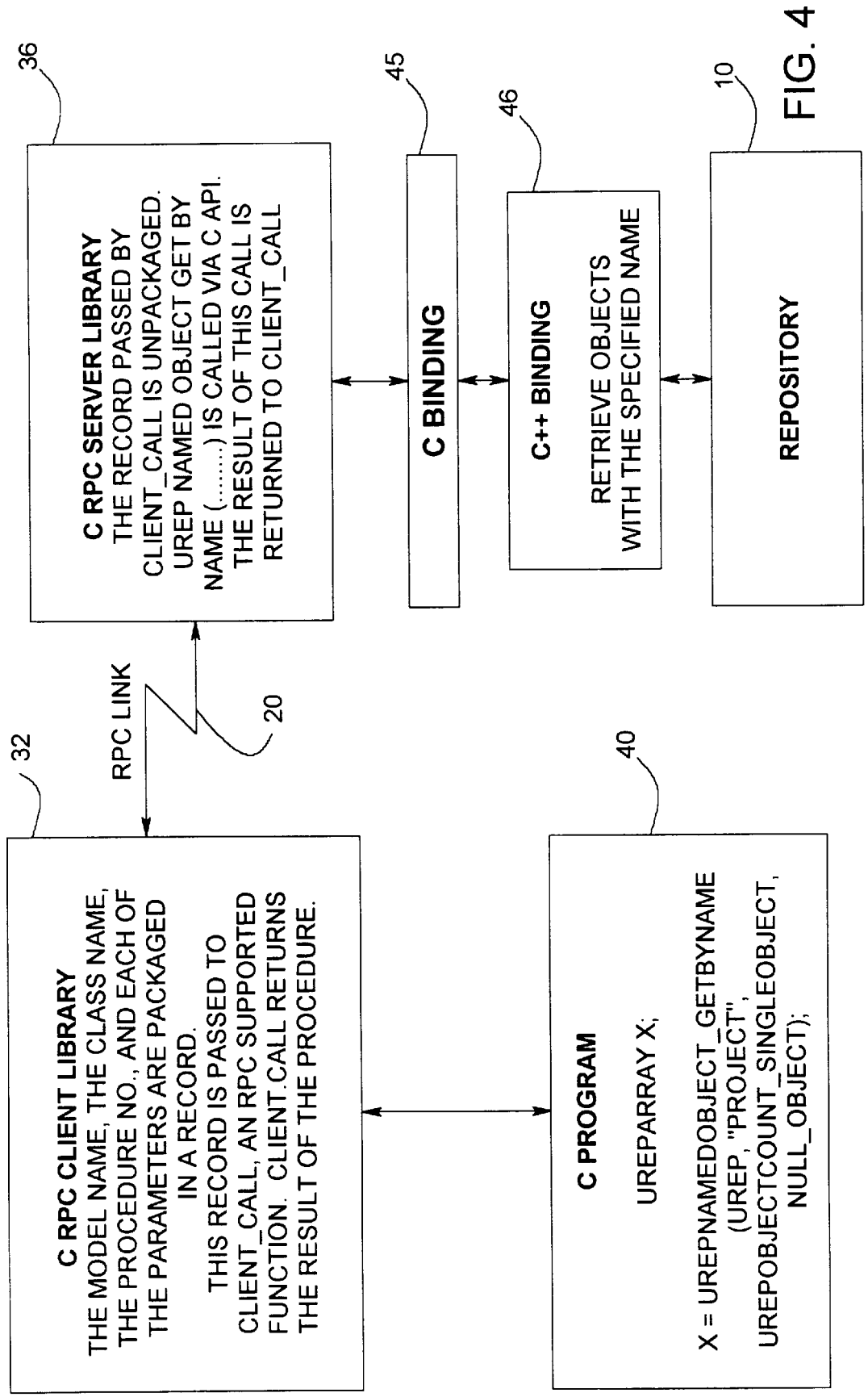
FIG. 4 illustrates an example of remotely calling an operation on objects in a repository from a C program.

Referring now to FIG. 4, an example of remotely calling an operation on objects in a repository from a C program is illustrated. The C program 40, declares a variable, X, of type UrepArray. This variable will hold the return value. Next, the C program 40 calls the "UrepNamedObject_getByName" function, which passes the four parameters noted. The last parameter (Null_Object) indicates this is an optional parameter. Inside the C RPC Client (block 41), the model name, "RSM", a number corresponding to UrepNamedObject class, the procedure number associated with the UrepNamedObject_getByName function, and each of the four parameters are packaged into a record. This record is passed to clnt_call, which is an RPC supported function. The RPC program 34 located on the Client platform sends the request to the Server where the RPC program 38 on the Server platform receives the request and sends it to the RPC Server library 36. The RPC Server library 36 unpackages the model name, the class number, and procedure number to determine that the call is UrepNamedObject_getByName. Each of the four parameters for the function is unpacked, and a C binding (block 45) UrepNamedObject_getByName( ) call is made with the appropriate parameters. After C binding 45 verifies the parameters, then the C++ binding (block 46), UrepPersistentObject::getByName( ) is called passing in the four parameters. For more information on such an interface as the C++ binding 46 reference is made to a co-pending patent application by Peter Johnson for A METHOD FOR PROVIDING OBJECT DATABASE INDEPENDENCE IN A PROGRAM WRITTEN USING THE C++ PROGRAMMING LANGUAGE, Ser. No. 08/505,140, filed Jul. 21, 1995; which application is assigned to the same assignee hereof.

The C++ binding 46, calls the repository to retrieve the objects with the desired name in the default namespace. The C++ binding 46 returns a UrepArray of UrepNamedObjects to the caller, the C binding 45. The C Binding then creates a copy of the array in its memory 14S and adds it to the next empty entry in the object list. The index of this entry is returned to the C RPC Server 42. The RPC Server 42 packs the result and sends it back to the RPC Client on the Client platform. The RPC Client 41 unpacks the result and sends it back to the C Program 40. The C program 40 now has an index which allows it to call functions that accept a UrepArray, such as size and lookup.

Figure 5:
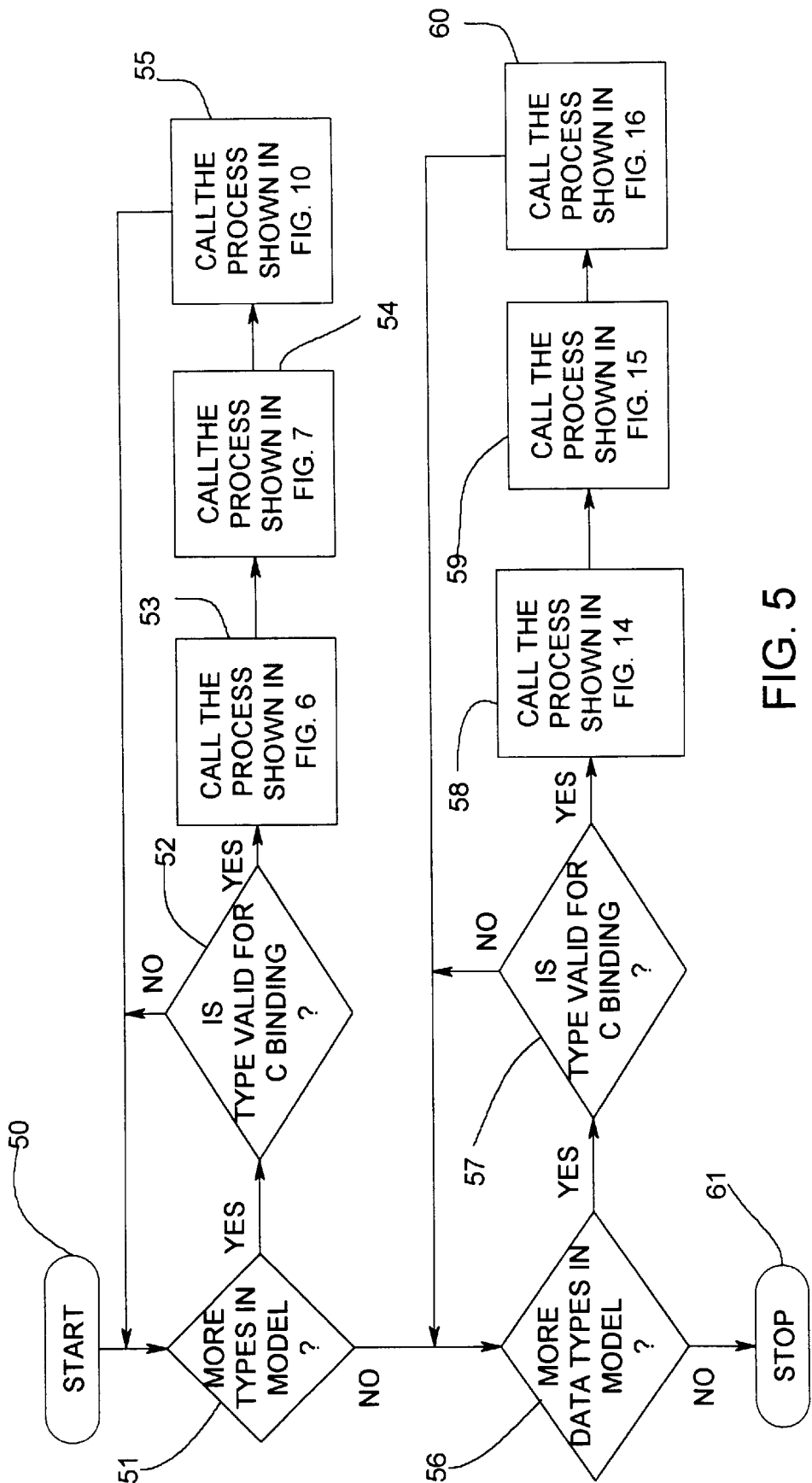
FIG. 5 is a flow chart that illustrates the steps in the Server for generating interoperability files for use by both the Client and the Server during run-time operations.
Figure 10:
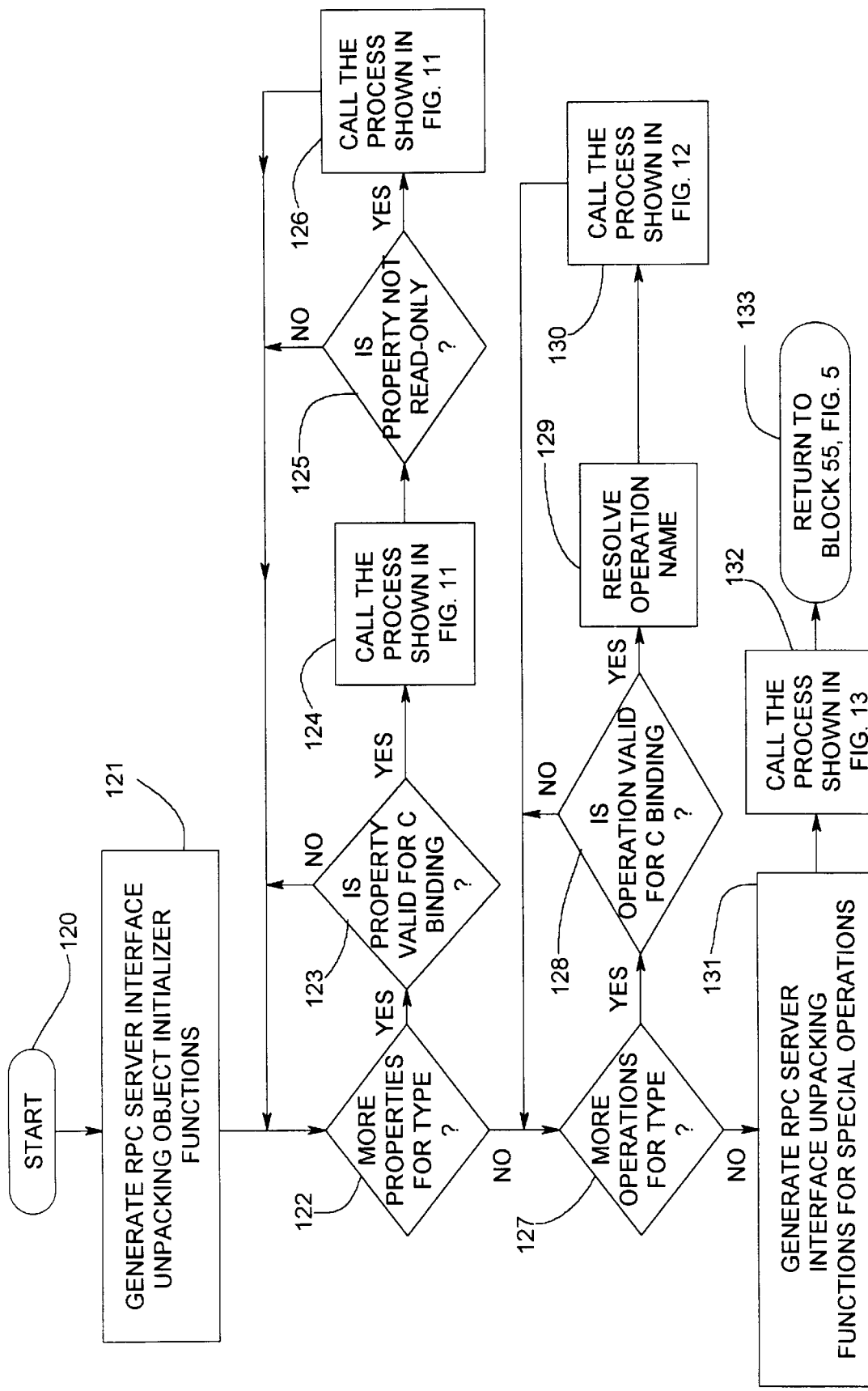
FIG. 10 is a flow chart that illustrates the steps for generating C Server unpacking interface functions.

Referring now to FIG. 5, a flow chart is illustrated of the steps for generating interoperability files for use by both the Client 11 and the Server 10 during operations. The process begins with a start bubble 50, followed by an inquiry as to whether or not there are more types in the model (diamond 51). If the answer to this inquiry is yes, then another inquiry is made as to whether or not the type is valid for C binding (diamond 52). That is, this inquiry determines if the type is publicly accessible. If the answer to this inquiry is no, then a return is made back to the diamond 51 for processing the next type. On the other hand, if the answer to this inquiry is yes, then the process shown in FIG. 6 and described hereinafter is called (block 53). This process generates the function numbers for types. Next, another process is called to generate C Client interface packing functions (block 54). This process is shown in FIG. 7 and described further hereinafter. Following this, still another process is called for generating C Server unpacking interface functions (block 55). This process is illustrated in FIG. 10 and described in detail hereinafter. Finally, a return is made back to the diamond 51 to process the next type in the model.

Figure 14:
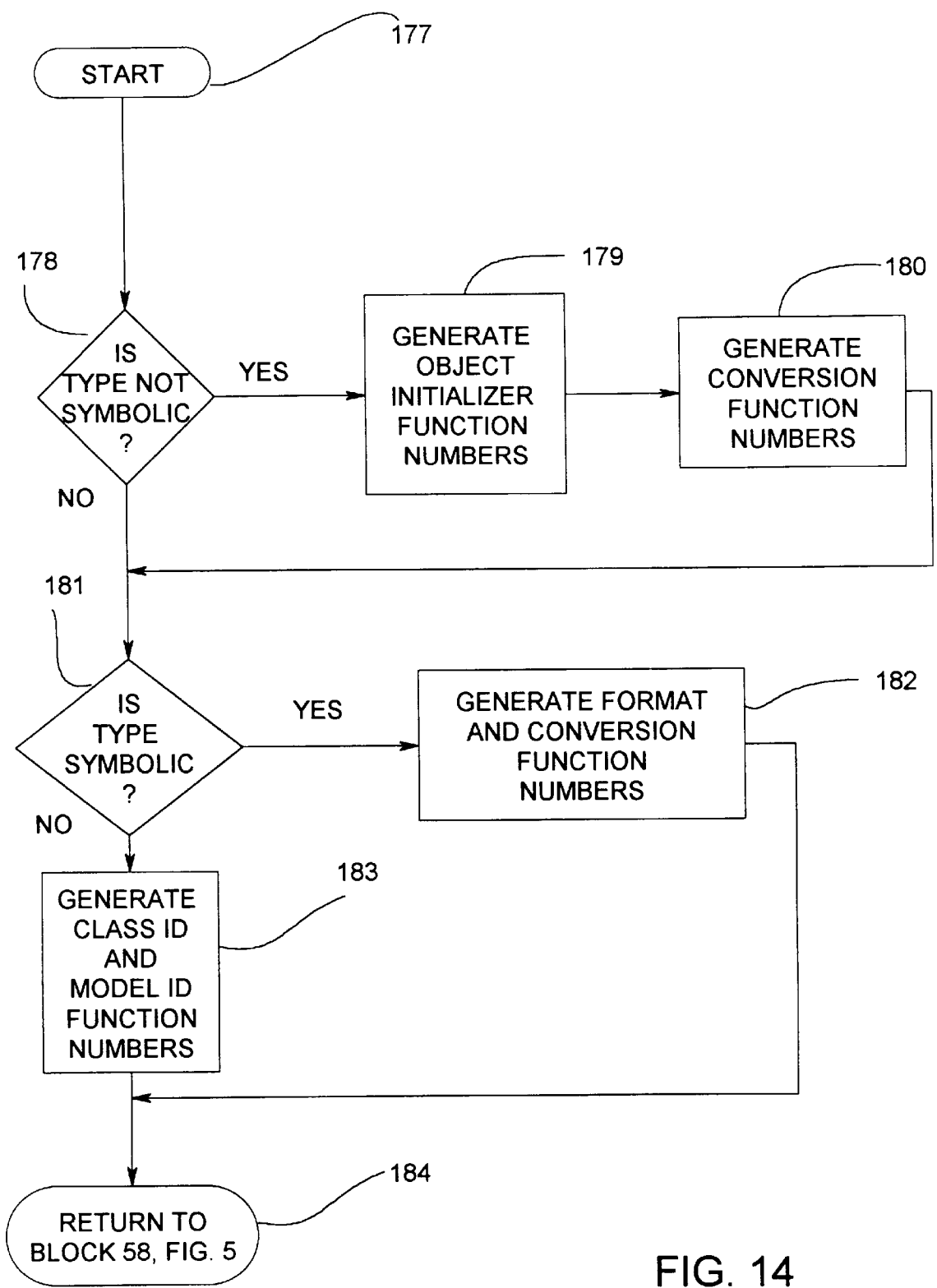
FIG. 14 is a flow chart that illustrates the steps for generating C function numbers for data types.
Figure 15:
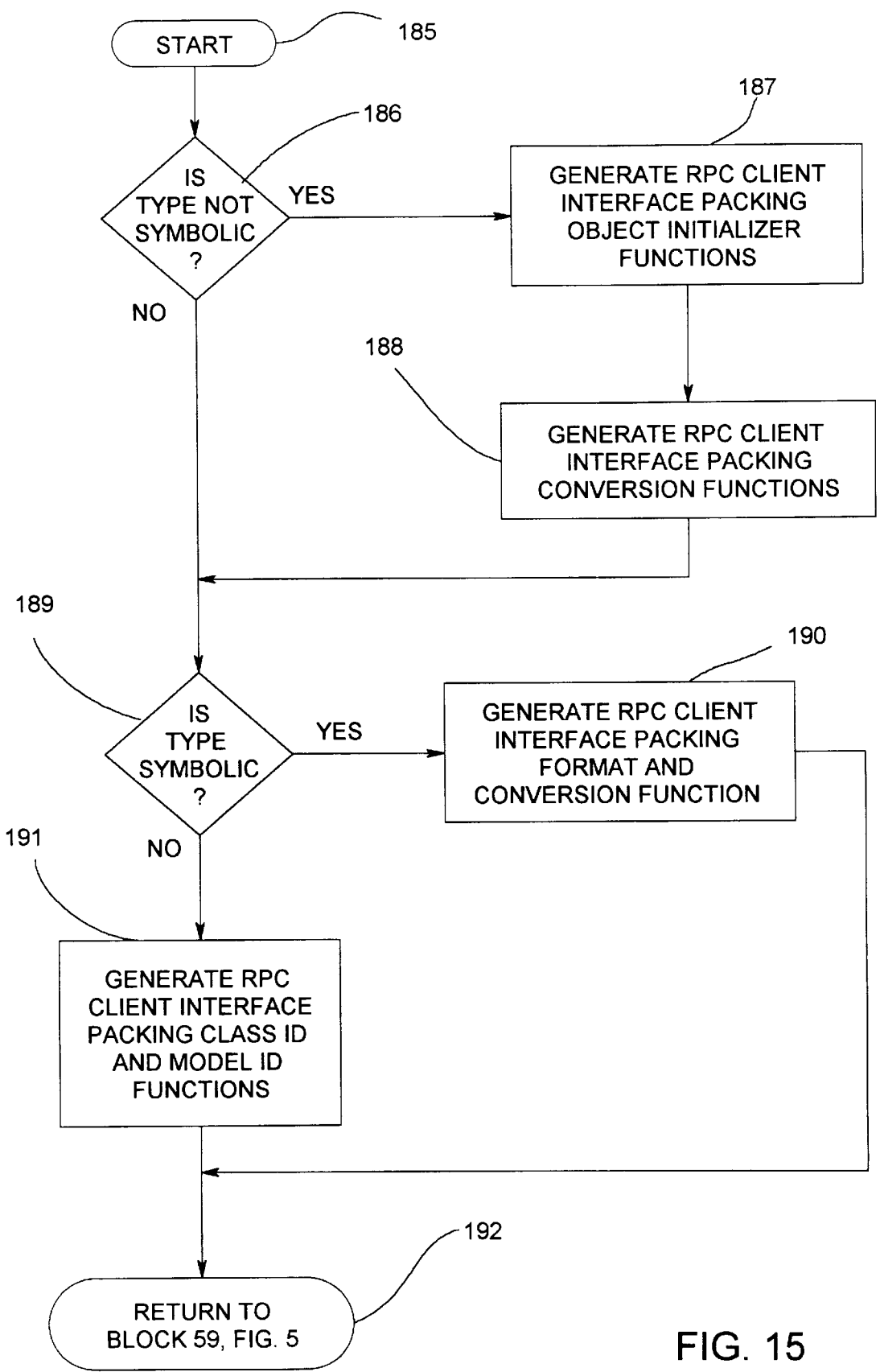
FIG. 15 is a flow chart that illustrates the steps for generating C Client interface packing functions for data types.
Figure 16:
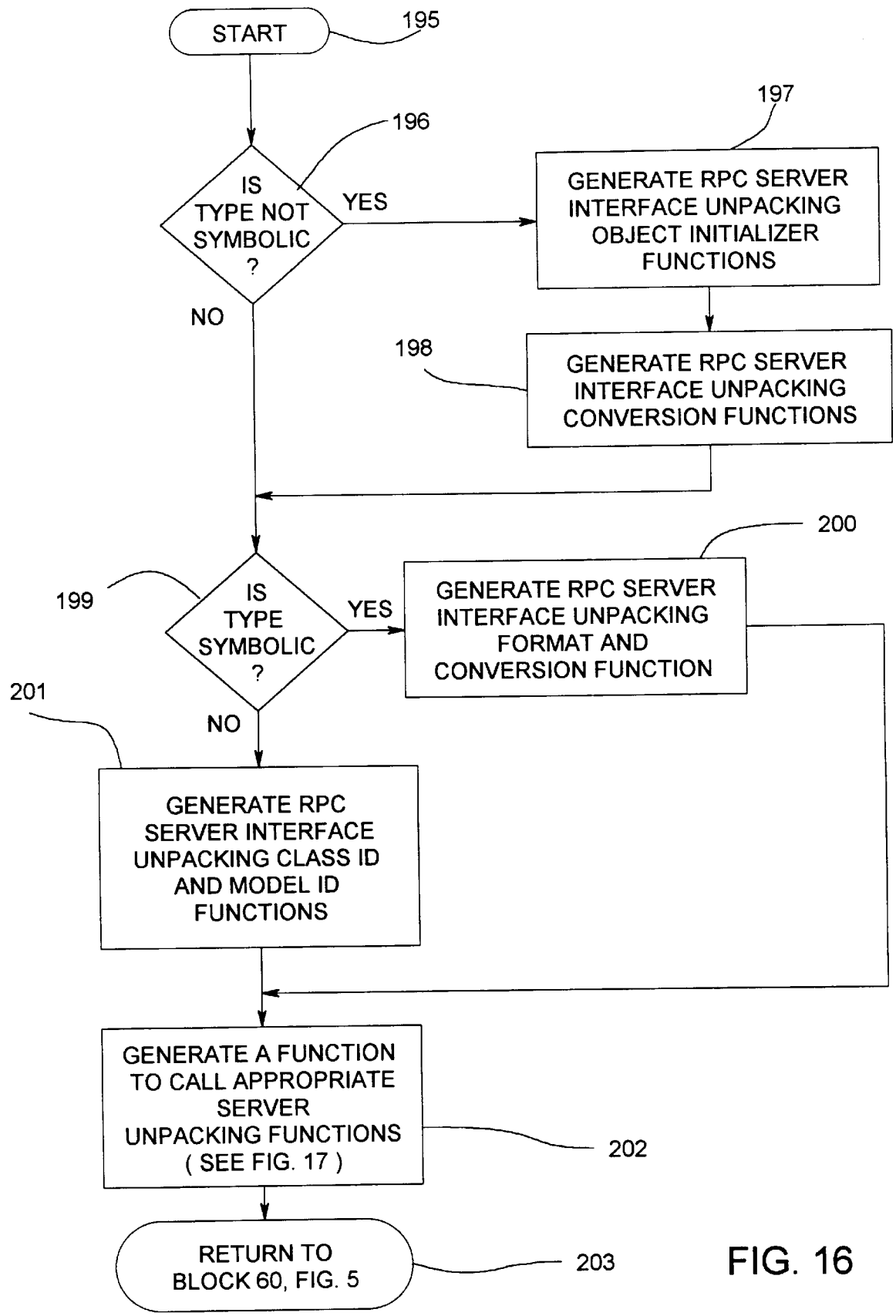
FIG. 16 is a flow chart that illustrates the steps for generating C Server interface unpacking functions for data types.

If the answer to the inquiry in the diamond 51 is no, then yet another inquiry is made as to whether or not there are more data types in the model (diamond 56). If the answer to this inquiry is yes, then still another inquiry is made as to whether or not the current type is valid for C binding (diamond 57). This inquiry determines if the C binding supports the current data type. If the answer to this inquiry is no then a return is made back to the diamond 56 for the next data type. On the other hand, if the type is valid for C binding then a process for generating C function numbers for data types is called (block 58). This process is shown in FIG. 14 and described further hereinafter. Next, a process for generating C Client interface packing functions for data types is called (block 59). This process is illustrated in FIG. 15 and described further hereinafter. Following this step, still another process is called for generating C Server interface unpacking functions for data types is called (block 60). This process is illustrated in FIG. 16 and described further hereinafter. Finally, a return is made back to the diamond 56 to process the next data type. If there are no more data types in model, then the process is stopped (bubble 61).

Figure 6:
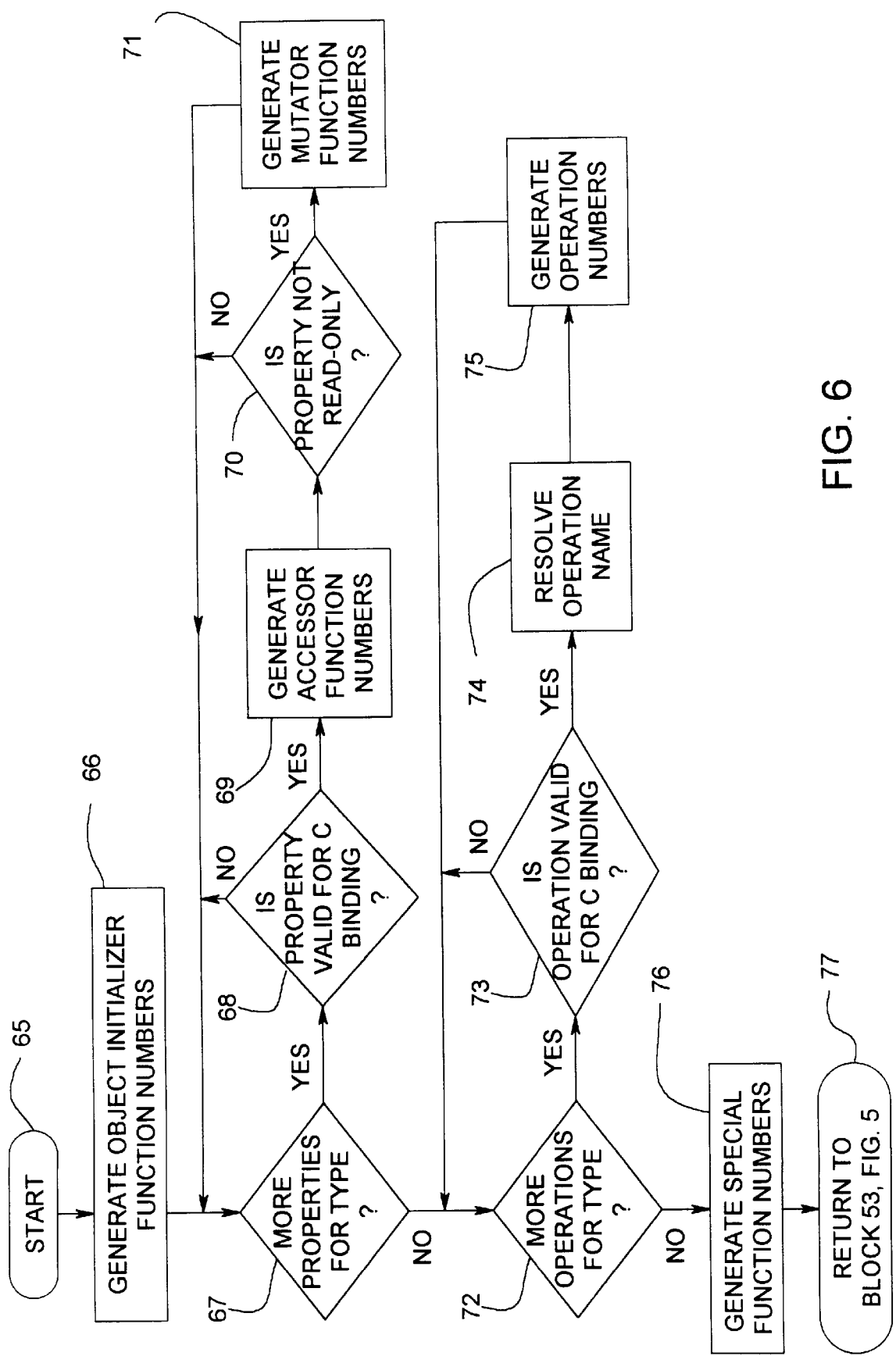
FIG. 6 is a flow chart that illustrates the steps for generating function numbers for types.
Figure 7:
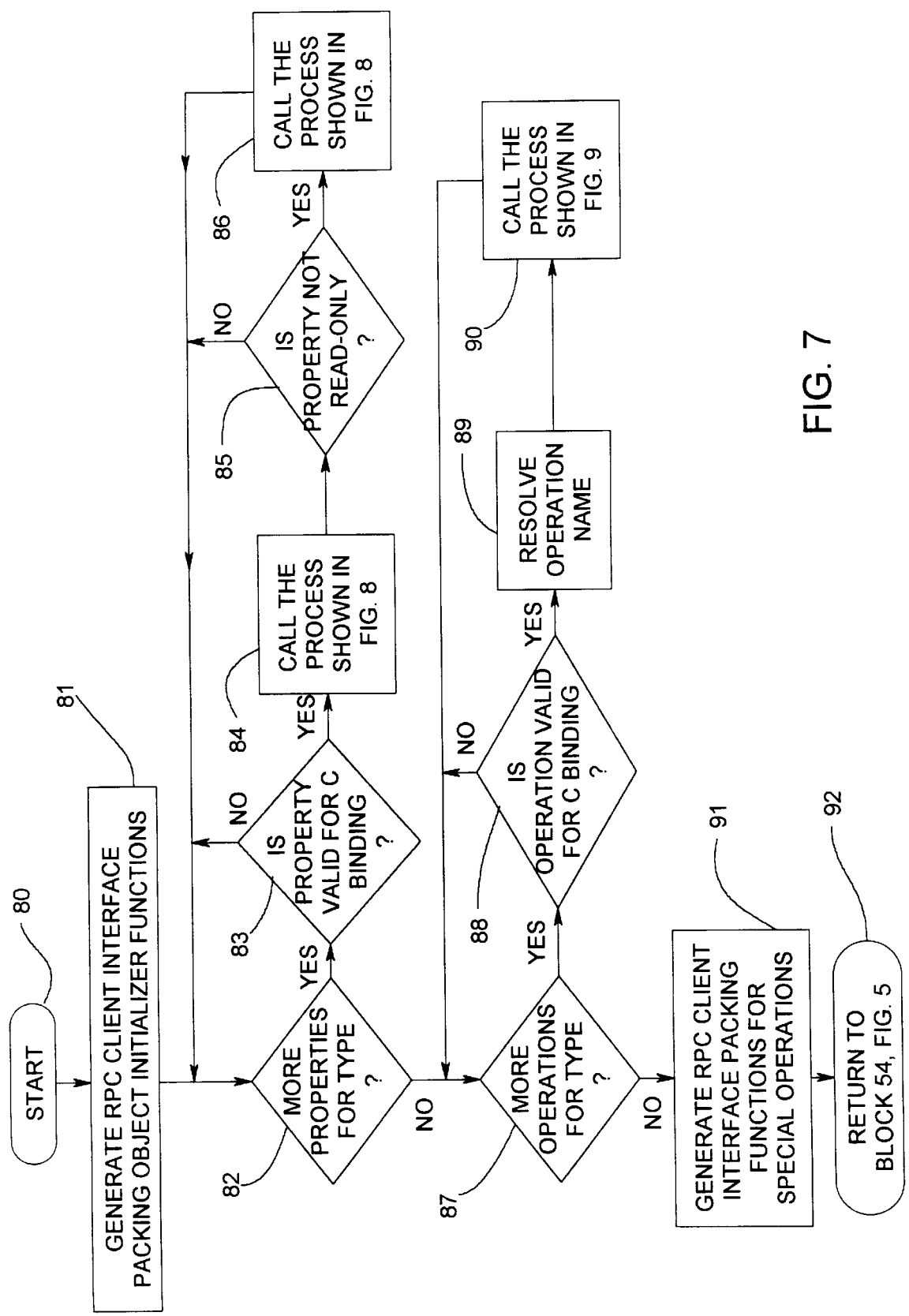
FIG. 7 is a flow chart that illustrates the steps for generating C Client interface packing functions.

Referring now to FIG. 6, a flow chart of the process alluded to above for generating function numbers for types is shown in greater detail. The process begins with a start bubble 65 followed by a process step of generating object initializer function numbers (block 66). This process step creates an instance of a specified object type on the Server. Next, an inquiry is made as to whether or not there are more properties for types (diamond 67). If the answer to this inquiry is yes, then another inquiry is made as to whether or not the property is valid for C binding (diamond 68). That is, this inquiry determines if the property is publicly accessible. If the answer to this inquiry is no, then a return is made back to the diamond 67 to process the next property for type. On the other hand if the answer to this inquiry is yes, then a process step of generating accessor function numbers is performed (block 69).

Once the accessor numbrs have been generated, yet another inquiry is made as to whether or not the property is not read-only (diamond 70). If the answer to this inquiry is no, then a return is made back to the diamond 67. On the other hand, if the property is not read-only, then a process step of generating mutator function numbers is performed (block 71). Finally, a return is made back to the diamond 67 for processing the next property for the type.

If there are no more properties for type (diamond 67), then yet another inquiry is made as to whether or not there are more operations for type to process (diamond 72). If the answer to this inquiry is yes, then still another inquiry is made as to whether or not the operation is valid for C binding. If the answer to this inquiry is no, then a return is made back to the diamond 72. On the other hand if the answer to this inquiry is yes, then a process step of resolving the operation name is performed (block 74). Next, a process step of generating operation numbers (block 75) is performed, and a return is then made back to the inquiry at diamond 72 to determine if there are more operations for type. If there are no more operations for type, then a process step of generating special function numbers is performed (block 76). Finally, the process returns to block 53 (FIG. 5), as depicted by a bubble 77.

Figure 8:
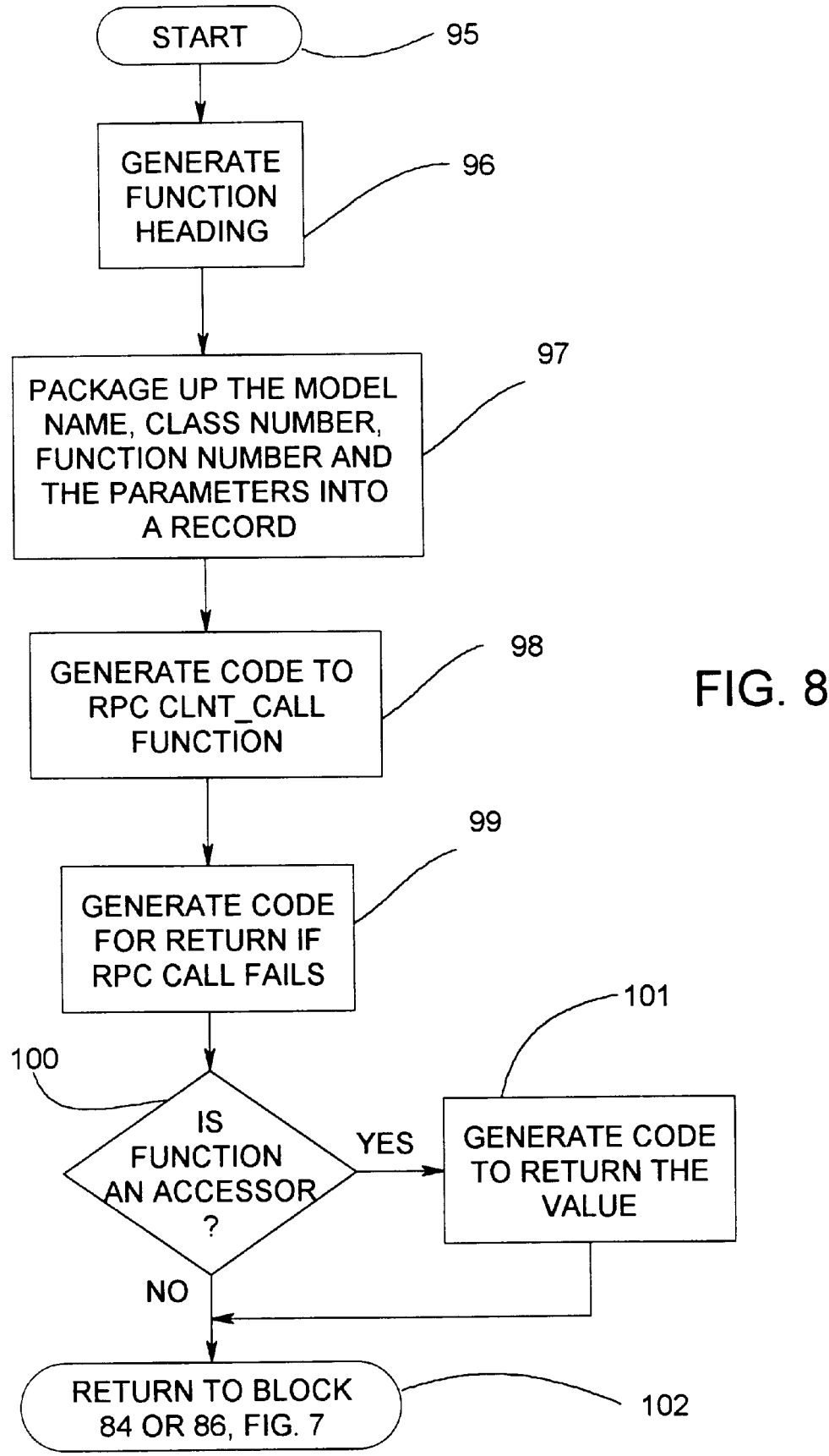
FIG. 8 is a flow chart that illustrates the steps for generating C Client interface packing code for accessor and mutator functions.

Referring now to FIG. 7, a flow chart of the process for generating C Client interface packing functions is illustrated. The process begins with a start bubble 80, followed by a process step of generating RPC client interface packing object initializer functions (block 81). Next, an inquiry is made as to whether or not there are more properties for the type (diamond 82). If the answer to this inquiry is yes, then another inquiry is made as to whether or not property is valid for C binding (diamond 83). This inquiry determines whether or not the property for type is publicly accessible. If the answer to this inquiry is no, then a return is made back to the diamond 82. On the other hand, if the answer to this inquiry is yes, then a process is called for generating C Client interface packing code for accessor functions (block 84). This process is illustrated in FIG. 8 and described further hereinafter. It is noted that the terms "accessor" and "mutator" refer to member functions that manipulate property values. Accessor and mutator functions are declared in a class declaration that corresponds to the type to which a property belongs. An accessor function obtains the value of a property. A mutator function modifies the value of a property.

Following this, an inquiry is made as to whether or not the property is not read-only (diamond 85). If the answer to this inquiry is no, then a return is made back to the diamond 82. On the other hand, if the answer is yes then the process for generating C Client interface packing code for mutator functions is called (block 86). This process is shown in FIG. 8 and described further hereinafter. Finally, a return is made back to the diamond 82 to process the next property for the type.

Figure 9:
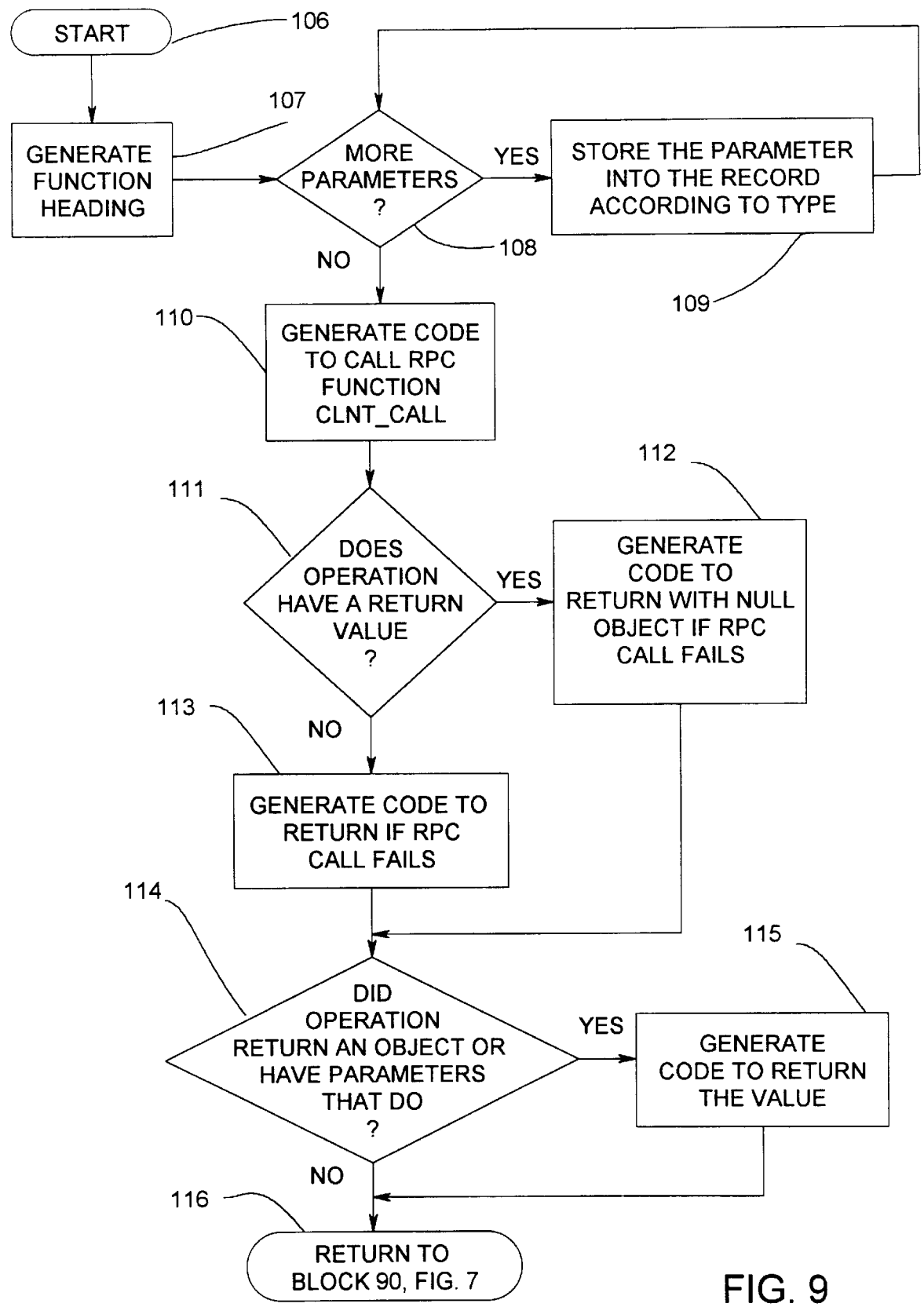
FIG. 9 is a flow chart that illustrates the steps for generating the C Client interface packing function for an operation.

If there are no more properties for the type, then another inquiry is made as to whether or not there are more operations for the type (diamond 87). If the answer to this inquiry is yes, then yet another inquiry is made as to whether or not the operation is valid for C binding (i.e., is the operation publicly accessible) (diamond 88). If the answer to this inquiry is no then a return is made back to the diamond 87 to process the next operation for type. On the other hand, if the answer to this inquiry is yes, then a process step of resolving the operation name is performed (block 89). That is, a determination is made if the operation is overloaded for this type. If it is, then a numeric suffix is created which is appended to the function name in order to prevent duplicate function names. Next, a process for generating the C Client interface packing function for an operation is called (block 90). This process is shown in FIG. 9, which is described further hereinafter. Finally, a return is made back to the diamond 87 to process the next operation for type. If there are no more operations for type, then a process step of generating RPC Client interface packing functions for special operations for the type is performed (block 91). Finally, the process returns to diamond 54 (FIG. 5), as depicted by a bubble 92.

Referring now to FIG. 8, a process for generating C Client interface packing code for accessor and mutator functions is illustrated. The process begins with a start bubble 95 followed by a process step of generating a function heading (block 96). Next, another process step of packaging up the model name, class number, function number and the parameters into a record is performed (block 97). Following this, yet another process step of generating code to RPC clnt_call function is performed (block 98). That is, code is generated to call clnt_call with the packaged record that contains all the information necessary to call the requested function on the Server. Still another process step is next performed to generate code for return if the RPC call fails (block 99).

An inquiry is then made as to whether or not a the function is an accessor (diamond 100). If the answer to this inquiry is yes, then a process step of generating code for returning the value is performed (block 101). On the other hand, if the answer to the inquiry at diamond 100 is no (or once the process step depicted by the block 101 is complete), the process returns to either block 84 or 86, depending upon which step called the process (bubble 102).

Referring now to FIG. 9, the process for generating C Client interface packing function for an operation is illustrated. The process begins with a start bubble 106 followed by a process step for generating a function heading with the return type and parameter list (block 107). That is, a C function is generated, which includes the return type, function name and a list of parameters enclosed in parentheses. Next, an inquiry is made as to whether or not there are more parameters (diamond 108). If the answer to this inquiry is yes, then a process step of storing the parameter into the record according to type is performed (block 109). That is, for each parameter, its type is determined and translated into an RPC compatible format. Once this step is complete, a return is made back to the diamond 108 to process the next parameter.

On the other hand, if the answer to the inquiry at diamond 108 is no, then another process step of generating code to call RPC function clnt_call is performed (block 110). Next, an inquiry is made as to whether or not the operation has a return value (diamond 111). If the operation has a return value, then code is generated to return with a null object if the RPC call fails (block 112). On the other hand, if the operation does not have a return value, then code is generated to return if the RPC call fails (block 113). Following this, an inquiry is made as to whether or not the operation returns an object, or has parameters that do (diamond 114). If the answer to this inquiry is yes, then code is generated to return the value (block 115). On the other hand, if the answer to this inquiry is no, or upon completion of the step depicted by the block 115, a return is made to the block 90 in FIG. 7 (bubble 116).

Referring now to FIG. 10, a flow chart of the process for generating C Server interface unpacking functions is illustrated. The process begins with a start bubble 120, followed by a process step of generating RPC Server interface unpacking object initializer functions (block 121). Next, an inquiry is made as to whether or not there are more properties for the type (diamond 122). If the answer to this inquiry is yes, then another inquiry is made as to whether or not property is valid for C binding (diamond 123). This inquiry determines whether or not the property for type is publicly accessible. If the answer to this inquiry is no, then a return is made back to the diamond 122. On the other hand, if the answer to this inquiry is yes, then a process is called for generating C Server interface unpacking code for accessor functions (block 124). This process is illustrated in FIG. 11 and described further hereinafter.

An inquiry is made as to whether or not property is not read-only (diamond 125). If the answer to this inquiry is no, then a return is made back to the diamond 122. On the other hand, if the answer is yes then the process for generating C Server interface unpacking code for mutator functions is called (block 126). This process is shown in FIG. 11 and described further hereinafter. Finally, a return is made back to the diamond 122 to process the next property for the type. If there are no more properties for the type, then another inquiry is made as to whether or not there are more operations for the type (diamond 127). If the answer to this inquiry is yes, then yet another inquiry is made as to whether or not the operation is valid for C binding.

Figure 12:
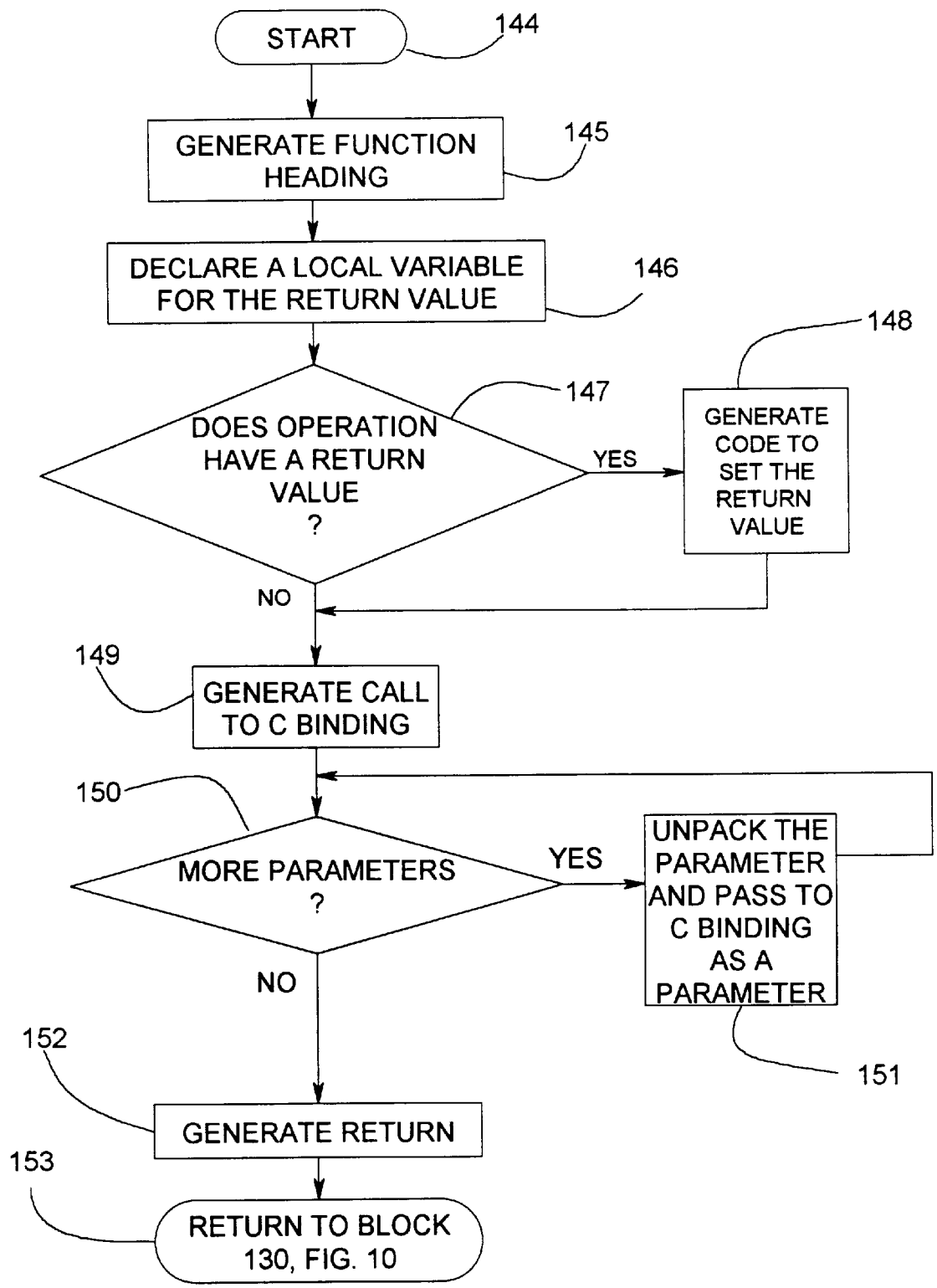
FIG. 12 is a flow chart that illustrates the steps for generating the C Server interface unpacking function for an operation.

If the answer to the inquiry in the diamond 128 is no, then a return is made back to the diamond 127 to process the next operation for type. On the other hand, if the answer to this inquiry is yes, then a process step of resolving operation name is performed (block 129). That is, a determination is made if the operation is overloaded for this type. If it is, then a numeric suffix is created which is appended to the function name in order to prevent duplicate function names. Next, a process step for generating the C Server interface unpacking function for an operation is called (block 130). This process is shown in FIG. 12, which is described further hereinafter. Finally, a return is made back to the diamond 127 to process the next operation for type. If there are no more operations for type, then a process step of generating RPC Server interface unpacking functions for special operations for the type is performed (block 131). After this step, a process for generating a function to call the appropriate Server unpacking function for a type is called (block 132). This process is illustrated in greater detail in FIG. 13 and described further hereinafter. Finally, the process returns to block 55 (FIG. 5), as depicted by a bubble 133.

Figure 11:
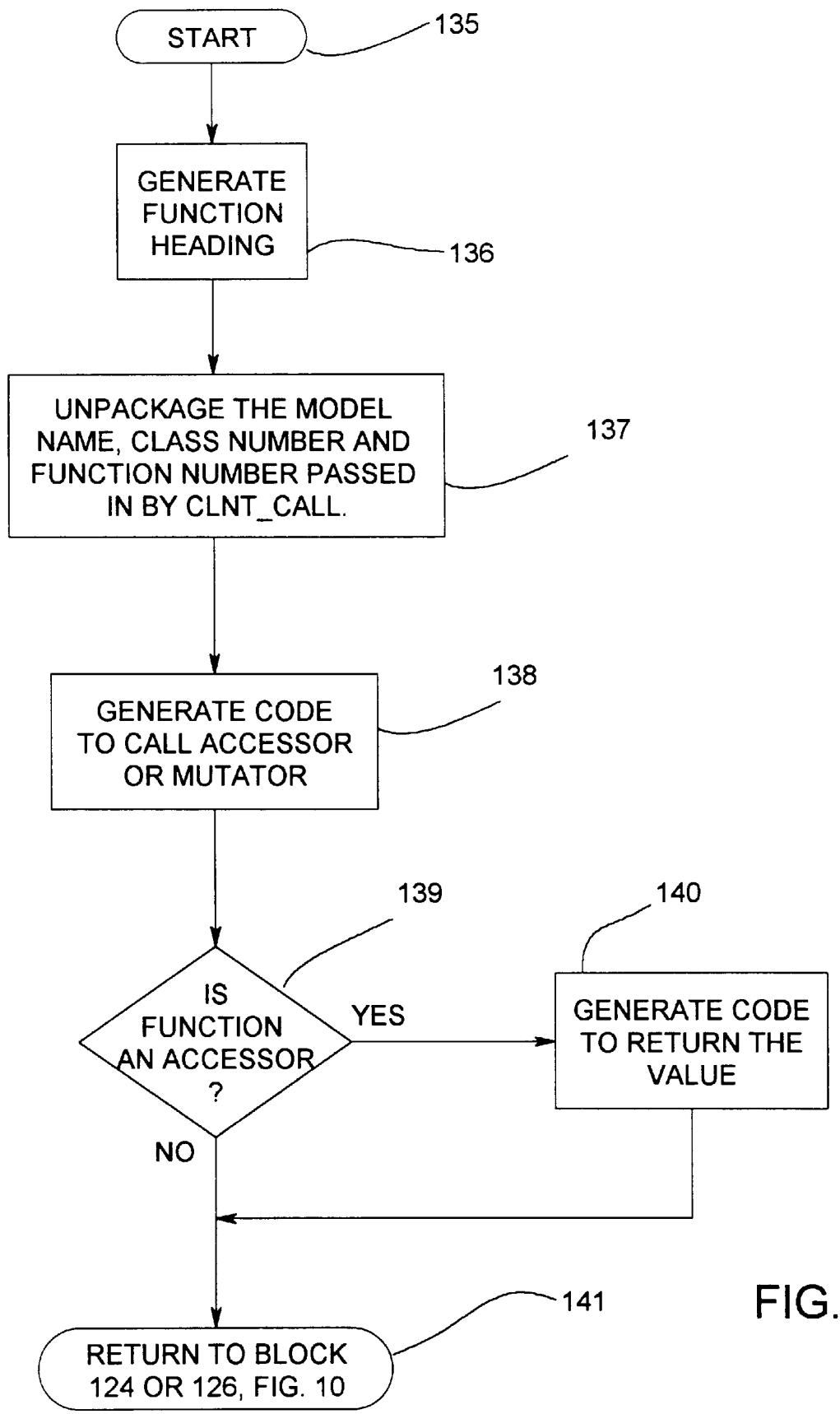
FIG. 11 is a flow chart that illustrates the steps for generating C Server interface unpacking code for accessor and mutator functions.

Referring now to FIG. 11, the process for generating C Server interface unpacking code for accessor and mutator functions is illustrated. The process begins with a start bubble 135 followed by a process step for generating a function heading with the return type and parameter list (block 136). That is, a C function is generated, which includes the return type, function name and a list of parameters enclosed in parentheses. Next, another process step is performed to unpackage the model name, class number and function number passed in by the clnt_call (block 137). Following this, yet another process step of generating code to call a C binding accessor or mutator is performed (block 138). Following this, an inquiry is made as to whether or not the function is an accessor. If the answer to this inquiry is yes, then code is generated to return the value (block 140). Once this step is complete, or if the function is not an accessor, a return is made to block 144 or 146, FIG. 10, as depicted by a bubble 141.

Referring now to FIG. 12, the process for generating C Server interface unpacking function for an operation is illustrated. The process begins with a start bubble 144 followed by a process step for generating a function heading with the return type and parameter list (block 145). That is, a C function is generated, which includes the return type, function name and a list of parameters enclosed in parentheses. Next, another process step of declaring a local variable for the return value is performed (block 146). Following this, an inquiry is made as to whether or not the operation has a return value (diamond 147). If the answer to this inquiry is yes, then a process step of generating code to set the return value is performed (block 148). Once this step has been completed, or if the operation does not have a return value, a call to C binding is performed (block 149).

An inquiry is next made as to whether or not there are more parameters (diamond 150). If the answer to this inquiry is yes, then a process step of unpacking the parameter and passing it to the C binding as a parameter is performed (block 151). That is, each parameter is unpacked and translated from an RPC compatible format to its original format. Once this step is complete, or if there are no more parameters, code is generated for a return (block 152), followed by a return to block 130, FIG. 10, as depicted by a bubble 153.

Figure 13:
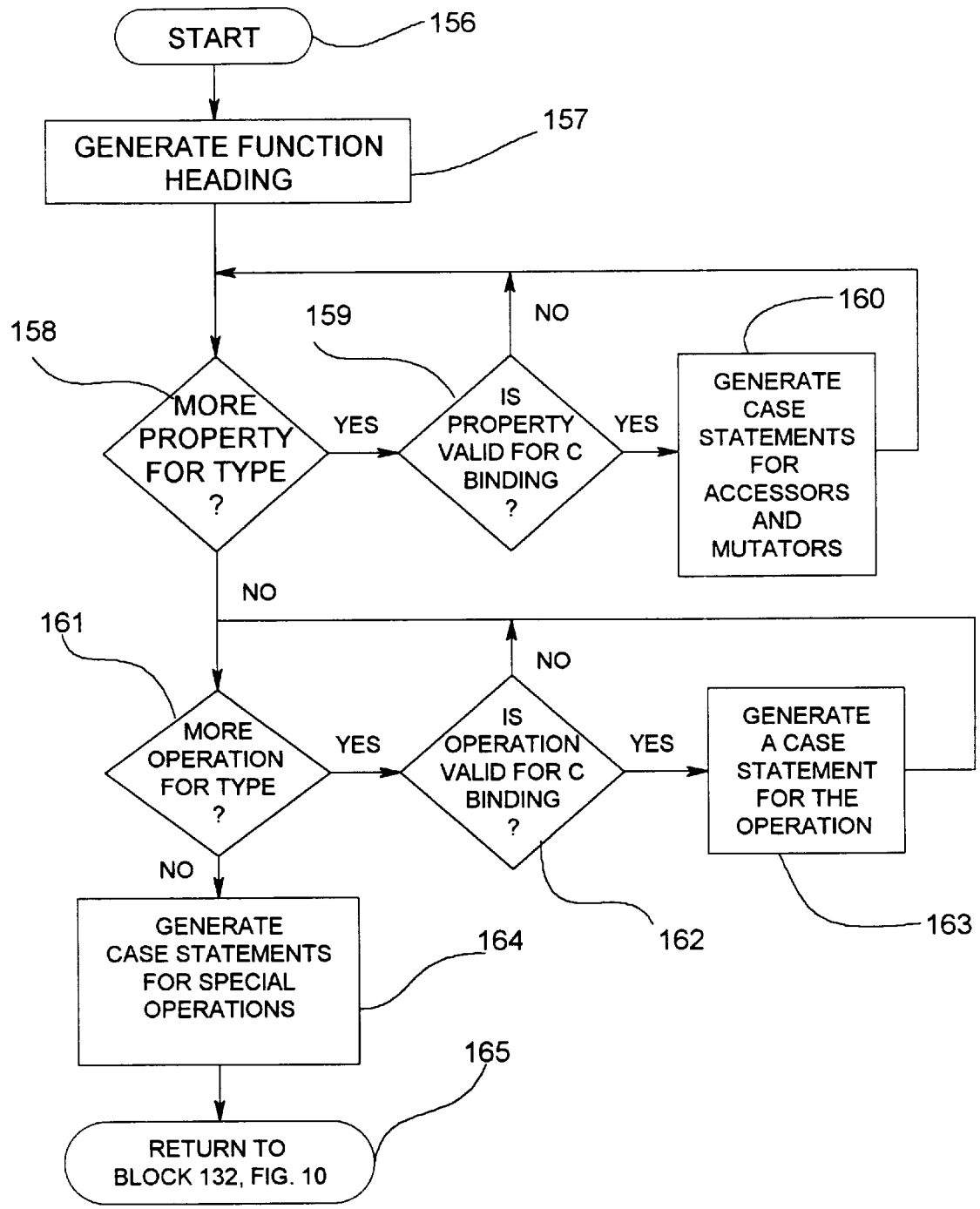
FIG. 13 is a flow chart that illustrates the steps for generating a function to call the appropriate Server unpacking function for a type.

Referring now to FIG. 13, a process for generating a function to call the appropriate Server unpacking functions for type is illustrated. The process begins with a start bubble 156, followed by a process step of generating function headings (block 157). Following this, an inquiry is made as to whether or not there are more property types (diamond 158). If the answer to this inquiry is yes, then another inquiry is made as to whether or not the property is valid for C binding (diamond 159). If the answer to this inquiry is no, then a return is made back to the diamond 158 for the next property. On the other hand, if the answer to this inquiry is yes, then a process step of generating conditions (i.e. CASE statements) to call the corresponding accessors and mutators is performed (block 160). Once this step is complete, then a return is made back to the diamond 158 for the next property.

Once all of the property types have been processed as above, then another inquiry is made as to whether or not there are more operations for type (diamond 161). If the answer to this inquiry is yes, then another inquiry is made as to whether or not the operation is valid for C binding (diamond 162). If the answer to this inquiry is no, then a return is made back to the diamond 161 for the next operation for type. On the other hand, if the operation is valid for C binding, then a process step of generating a CASE statement for the operation name is performed (block 163). Once this step has been performed, then a return is made back to the diamond 161 for the next operation for type. After all of the operations for type have been processed, yet another process step of generating case statements for special operations is performed (block 164). Finally, a return is made to the block 60 in FIG. 5 as depicted by a bubble 165.

Referring now to FIG. 14, the process for generating C function numbers for data types is illustrated. The process begins with a start bubble 177, followed by an inquiry as to whether or not the type is not symbolic (diamond 178). If the answer to this inquiry is yes, then object initializer function numbers are generated (block 179). Next, conversion function numbers are generated (block 180).

Following these steps, or if type is symbolic (i.e., not not symbolic), yet another inquiry is made as to whether or not type is symbolic (diamond 181). If the answer to this inquiry is yes, then the format and conversion function numbers are generated (block 182). If the type is not symbolic, the class id and model id function numbers are generated (block 183). After completion of this step, or upon completion of the process step depicted by the block 182, the process returns to block 58 (FIG. 5), as depicted by a bubble 184.

Referring now to FIG. 15, the process for generating C Client interface packing functions for data types is illustrated. The process begins with a start bubble 185, followed by an inquiry as to whether or not the data type is not symbolic (diamond 186). If the data type is not symbolic, then RPC Client interface packing object initializer functions are generated (block 187). Next, RPC Client interface packing conversion functions are generated (block 188). Following these steps, or if the data type is symbolic (diamond 186), another inquiry is made as to whether or not type is symbolic (diamond 189). If the answer to this inquiry is yes, then RPC Client interface packing format and conversion functions for the symbolic type are generated (block 190). If the type is not symbolic, then RPC Client interface packing Class id and Model id functions are generated (block 191). Once this step is complete, or following completion of the step depicted by the process block 190, the process returns to block 59 (FIG. 5), as depicted by a bubble 192.

Referring now to FIG. 16, a flow chart illustrating the steps of a process for generating C Server interface unpacking functions for data types is shown. The process begins with a start bubble 195, followed by an inquiry as to whether or not type is not symbolic (diamond 196). If the answer to this inquiry is yes, then a process step of generating RPC Server interface unpacking object initializer functions is performed (block 197). Next, another process step of generating RPC Server interface unpacking conversion functions is performed (block 198). Following these steps, or if type is not not symbolic, then another inquiry is made as to whether or not type is symbolic (diamond 199). If the answer to this inquiry is yes, then a process step of generating RPC Server interface unpacking format and conversion functions is performed (block 200). On the other hand, if the answer to inquiry in diamond 179 is no, then yet another process step of generating RPC Server interface unpacking class id and model id functions is performed (block 201). Once this step has been performed, or upon completion of the step depicted by the block 200, still another process step of generating a function to call appropriate Server unpacking functions is performed (block 202). This process step is illustrated in greater detail in FIG. 17 and described hereinafter. Upon completion of this process step, a return is made to the program at block 60 (FIG. 5) as depicted by a bubble 203.

Figure 17:
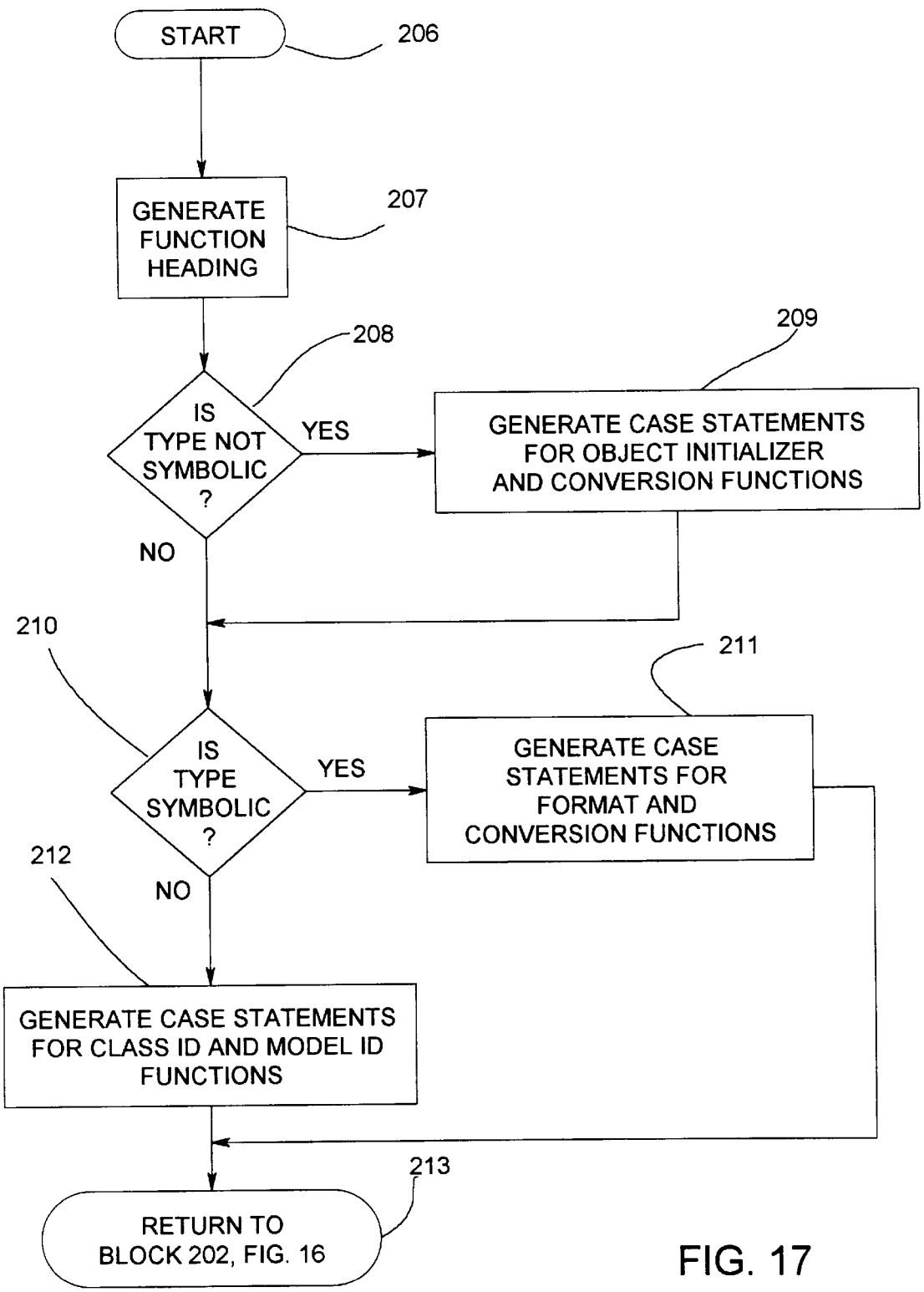
FIG. 17 is a flow chart that illustrates the steps for generating a function to call the appropriate Server unpacking functions for data types.

Referring now to FIG. 17, a process for generating a function to call the appropriate Server unpacking functions for a data type is illustrated. The process begins with a start bubble 206, followed by a process step of generating function headings (block 207). Next, an inquiry is made as to whether or not type is not symbolic (diamond 208). If type is not symbolic, then a process step of generating CASE statements for object initializer and conversion functions is performed (block 209). After completion of this step, of type is not not symbolic (no leg of the diamond 208), then another inquiry is made as to whether or not type is symbolic (diamond 210). If type is symbolic then a process step of generating CASE statements for format and conversion functions is performed (block 211).

If type is not symbolic (no leg of the diamond 210) then a process step of generating CASE statements for class id and model id functions is performed (block 212). Following completion of this step, or upon completion of the step depicted by the block 211, a return is made back to the process of FIG. 16 (bubble 213).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a server including a CPU, a memory, at least one disk drive and an object-oriented repository, a client remotely located from said server and connected thereto by means of an RPC link, said client including a CPU, a memory, at least one disk drive, and a program operating with said Server for remotely accessing a model stored in said object-oriented repository, said program executing a method for packing and unpacking C functions to and from, respectively, RPC compatible format using RPC protocol, said program comprising the steps of:

a. for each type in said model, determining if a current one of said types is valid for C binding, and if so;

b. generating function numbers for said current type, including:
   1) generating object initializer function numbers for said current type;
   2) determining if there are more properties for said current type, and if so;
   3) for each property for said current type, determining if a current one of said properties is valid for C binding, and if so;
   4) generating accessor function numbers for said current property;
   5) determining if said current property is not read-only, and if so;
   6) generating mutator function numbers for said current property;
   7) if there are no more properties for said current type, determining if there are more operations for said current type, and if so;
   8) for each operation for said current type, determining if a current one of said operations is valid for C binding, and if so;
   9) resolving operation name for said current operation;
   10) generating operation numbers for said current operation;
   11) if there are no more operations for said current type, generating special function numbers for said current type; and,
   12) returning to said program at step b hereof;

c. generating C client interface packing functions for said current type;

d. generating C server interface unpacking functions for said current type;

e. determining if there are more of said types in said model, and if so, repeating steps a through e hereof;

f. if there are no more types, then;

g. for each data type in said model, determining if a current one of said data types is valid for C binding, and if so;

h. generating C function numbers for said current data type;

i. generating C client interface packing functions for said current data type;

j. generating C server interface unpacking functions for said current data type;

k. determining if there are more data types in said model, and if so, repeating steps h through m hereof; and, l. if there are no more data types in said model, stopping said program.

2. A method as in claim 1 wherein said step of generating C Client interface packing functions for said current type further comprises:
   a. generating RPC client interface packing object initializer functions for said current type;
   b. determining if there are more properties for said current type, and if so;
   c. for each property for said current type, determining if a current one of said properties is valid for C binding, and if so;
   d. generating C client interface packing code for accessor functions for said current property,
   e. determining if said current property is not read-only, and if so;
   f. generating C client interface packing code for mutator functions for said current property;
   g. if there are no more properties for said type, determining if there are more operations for said type, and if so;
   h. for each operation for said type, determining if a current one of said operations is valid for C binding, and if so;
   i. resolving operation name for said current operation;
   j. generating a C client interface packing function for said current operation;
   k. if there are no more operations for said type, generating an RPC client interface packing function for any special operations; and,
   l. returning to step c of claim 1 hereof.

3. A method as in claim 2 wherein said step of generating C Client interface packing code for accessor functions for said current property further comprises:
   a. generating function heading with correct parameters for said current property;
   b. packaging up model name, class number, function number and parameters of said current property into a record;
   c. generating code to RPC clnt_call function to initiate a request to said server;
   d. generating code for return if RPC call fails;
   e. determining if function is an accessor, and if so;
   f. generating code to return a value for said accessor; and,
   g. returning to said program at step d of claim 2.

4. A method as in claim 2 wherein said step of generating C Client interface packing code for mutator functions for said current property further comprises:
   a. generating function heading with correct parameters for said current property;
   b. packaging up model name, class number, function number and parameters of said current property into a record;
   c. generating code to RPC clnt_call function to initiate a request to said server;
   d. generating code for return if RPC call fails;
   e. determining if function is an accessor, and if not;
   f. returning to said program at step f of claim 2.

5. A method as in claim 2 wherein said step of generating C Client interface packing function for said current operation further comprises:
   a. generating function heading with a return type and a parameter list for said operation;
   b. determining if there are more parameters, and if so;
   c. for each parameter, storing said parameter into a record according to type;
   d. when there are no more parameters, generating code to call RPC function clnt_call to initiate a request to said server;
   e. determining if said current operation has a return value, and if so;
   f. generating code to return with null object if said RPC call fails;
   g. if said current operation does not have a return value, generating code to return if said RPC call fails;
   h. determining if said current operation returns an object or has parameters that do, and if so;
   i. generating code to return a value for said object as requested by said client;
   j. returning to said program at step h of claim 2 hereof.

6. A method as in claim 1 wherein said step in said server of generating C server interface unpacking functions for said current type further comprises:
   a. generating RPC server interface unpacking object initializer functions for said current type;
   b. determining if there are more properties for said current type, and if so;
   c. determining if a current property for said current type is valid for C binding, and if so;
   d. generating C server interface unpacking code for accessor functions for said current property;
   e. determining if said current property is not read-only, and if so;
   f. generating C server interface unpacking code for mutator functions for said current property;
   g. if there are no more properties for said current types, determining if there are more operations for said current type, and if so;
   h. determining if a current operation for said current type is valid for C binding, and if so;
   i. resolving operation name for said current operation;
   j. generating a C server interface unpacking function for said current operation;
   k. if there are no more operations for said current type, generating RPC server interface unpacking functions for special operations; and
   l. generating a function such that an appropriate C server interface unpacking function for said current type is called; and,
   m. returning to said program at step e of claim 1 hereof.

7. A method as in claim 6 wherein said step of generating C server interface unpacking code for accessor functions for said current property further comprises:
   a. generating function heading with correct parameters for said current property;
   b. unpacking model name, class number, function number and parameters of said current property transmitted from said client in response to said clnt_call;
   c. generating code to call accessor function;
   d. determining if function is an accessor, and if so;
   e. generating code to return a value for said accessor; and,
   f. returning to said program at step d of claim 6.

8. A method as in claim 6 wherein said step of generating C server interface unpacking code for mutator functions for said current property further comprises:
   a. generating function heading with correct parameters for said current property;
   b. unpacking model name, class number, function number and parameters of said current property transmitted from said client in response to said clnt_call;

c. generating code to call a mutator function;

d. determining if function is an accessor, and if not;

e. returning to said program at step f of claim 6.

9. A method as in claim 6 wherein said step of generating a C server interface unpacking function for said current operation further comprises:

a. generating a function heading for said current operation;

b. declaring a local variable for a return value for said current operation;

c. determining if said current operation has a return value, and if so;

d. generating code to set return value for said current operation;

e. generating a code to call said current operation in C binding;

f. determining if there are more parameters, and if so;

g. unpacking a current one of said parameters and pass to C binding call as a parameter;

h. if there are no more parameters, generating a return of said local variable to said client; and, i. returning to step j of claim 9 hereof.

10. A method as in claim 6 wherein said step of generating a function to call an appropriate server unpacking function for type further comprises:

a. generating a function heading for said function;

b. generating a switch statement for said function;

c. for each property of type, determining if a current one of said properties is valid for C binding, and if so;

d. generating case statements for accessor and mutator functions for said current property;

e. if there are no more properties for type, for each operation of type, determining if a current one of said operations is valid for C binding, and if so;

f. generating a case statement for name of said current operation;

g. if there are no more operations for type, generating case statements for special operations; and, h. returning to said program at step l of claim 6 hereof.

11. A method as in claim 1 wherein said step of generating function numbers for said current data type further comprises:

a. determining if said current data type is not symbolic, and if not:

i) generating object initializer function numbers for said current data type;

ii) generating conversion function numbers for said current data type;

d. determining if said current data type is symbolic, and if so;

e. generating format and conversion function number;

f. if said current data type is not symbolic, generating class id and model id function numbers for said current data type; and, g. returning to said program at step i of claim 1 hereof.

12. A method as in claim 1 wherein said step of generating C client interface packing functions for said current data type further comprises:

a. determining if said current data type is not symbolic, and if not:

i) generating RPC client interface packing object initializer functions;

ii) generating RPC client interface packing conversion functions;

b. if said current data type is not not symbolic, determining if said current data type is symbolic, and if so;

c. generating RPC client interface packing format and conversion functions for said current data type;

d. if said current data type is not symbolic, generating class id and model id functions for said current data type; and, e. returning to said program at step i of claim 1 hereof.

13. A method as in claim 1 wherein said step in said server of generating C server interface unpacking functions for data types further comprises:

a. determining if said current data type is not symbolic, and if not:

i) generating RPC server interface unpacking object initializer functions;

ii) generating RPC server interface unpacking conversion functions;

b. if said current data type is not not symbolic, determining if said current data type is symbolic, and if so;

c. generating RPC server interface unpacking format and conversion functions for said current data type;

d. if said current data type is not symbolic, generating RPC server interface unpacking class id and model id functions for said current data type;

e. generating a function that makes a switch statement to call an appropriate C server interface unpacking function for said current data type is called; and, f. returning to said program at step l of claim 1 hereof.

14. A method as in claim 13 wherein said step of generating a function that makes a switch statement to call an appropriate C server interface unpacking function for said current data type further comprises:

a. generating a heading for said function;

b. determining if said current data type is not symbolic, and if not:

i) generating CASE statements for object initializer functions;

ii) generating CASE statements for conversion functions;

c. if said current data type is not not symbolic, determining if said current data type is symbolic, and if so;

i) generating CASE statements for format;

ii) generating CASE statements for conversion functions for said current data type;

d. if said current data type is not symbolic, generating CASE statements for class id and model id functions for said current data type; and, e. returning to said program at step e of claim 13 hereof.

15. In a computer system having a server including a CPU, a memory, at least one disk drive and an object-oriented repository, a client remotely located from said server and connected thereto by means of an RPC link, said client including a CPU, a memory, at least one disk drive, and a program operating with said Server for remotely accessing a model stored in said object-oriented repository, said program executing a method for packing and unpacking C functions to and from, respectively, RPC compatible format using RPC protocol, said program comprising the steps of:

a. for each type in said model, determining if a current one of said types is valid for C binding, and if so;

b. generating function numbers for said current type by:
1) generating object initializer function numbers for said current type;
2) determining if there are more properties for said current type, and if so;
3) for each property for said current type, determining if a current one of said properties is valid for C binding, and if so;
4) generating accessor function numbers for said current property;
5) determining if said current property is not read-only, and if so;
6) generating mutator function numbers for said current property;
7) if there are no more properties for said current type, determining if there are more operations for said current type, and if so;
8) for each operation for said current type, determining if a current one of said operations is valid for C binding, and if so;
9) resolving operation name for said current operation;
10) generating operation numbers for said current operation;
11) if there are no more operations for said current type, generating special function numbers for said current type;
c. generating C client interface packing functions for said current type;
d. generating C server interface unpacking functions for said current type received from said client;
e. determining if there are more of said types in said model, and if so, repeating steps a through e hereof;
f. if there are no more types, then;
g. for each data type in said model, determining if a current one of said data types is valid for C binding, and if so;
h. generating C function numbers for said current data type;
i. generating C client interface packing functions for said current data type;
j. generating C server interface unpacking functions for data types;
k. determining if there are more data types in said model, and if so, repeating steps h through m hereof; and,
l. if there are no more data types in said model, stopping said program.

16. A method as in claim 15 herein said step of generating C Client interface packing functions for said current type further comprises:
a. generating RPC client interface packing object initializer functions for said current type;
b. determining if there are more properties for said current type, and if so;
c. for each property for said current type, determining if a current one of said properties is valid for C binding, and if so;
d. generating C client interface packing code for accessor functions for said current property,
e. determining if said current property is not read-only, and if so;
f. generating C client interface packing code for mutator functions for said current property;
g. if there are no more properties for said type, determining if there are more operations for said type, and if so;
h. for each operation for said type, determining if a current one of said operations is valid for C binding, and if so;
i. resolving operation name for said current operation;
j. generating a C client interface packing function for said current operation;
k. if there are no more operations for said type, generating an RPC client interface packing function for any special operations; and,
l. returning to step c of claim 15 hereof.

17. A method as in claim 16 wherein said step of generating C Client interface packing function for said current operation further comprises:
a. generating function heading with a return type and a parameter list for said operation;
b. determining if there are more parameters, and if so;
c. for each parameter, storing said parameter into a record according to type;
d. when there are no more parameters, generating code to call RPC function clnt_call to initiate a request to said server;
e. determining if said current operation has a return value, and if so;
f. generating code to return with null object if said RPC call fails;
g. if said current operation does not have a return value, generating code to return if said RPC call fails;
h. determining if said current operation returns an object or has parameters that do, and if so;
i. generating code to return a value for said object as requested by said client;
j. returning to said program at step h of claim 16 hereof.

18. A method as in claim 15 wherein said step in said server of generating C server interface unpacking functions for said current type further comprises:
a. generating RPC server interface unpacking object initializer functions for said current type;
b. determining if there are more properties for said current type, and if so;
c. determining if a current property for said current type is valid for C binding, and if so;
d. generating C server interface unpacking code for accessor functions for said current property;
e. determining if said current property is not read-only, and if so;
f. generating C server interface unpacking code for mutator functions for said current property;
g. if there are no more properties for said current types, determining if there are more operations for said current type, and if so;
h. determining if a current operation for said current type is valid for C binding, and if so;
i. resolving operation name for said current operation;
j. generating a C server interface unpacking function for said current operation;
k. if there are no more operations for said current type, generating RPC server interface unpacking functions for special operations; and
l. generating a function such that an appropriate C server interface unpacking function for said current type is called; and,
m. returning to said program at step e of claim 15 hereof.

19. A method as in claim 18 wherein said step of generating C server interface unpacking code for accessor functions for said current property further comprises:

a. generating function heading with correct parameters for said current property;
b. unpacking model name, class number, function number and parameters of said current property transmitted from said client in response to said clnt_call;
c. generating code to call accessor function;
d. determining if function is an accessor, and if so;
e. generating code to return a value for said accessor; and,
f. returning to said program at step d of claim 18.

20. A method as in claim 18 wherein said step of generating C server interface unpacking code for mutator functions for said current property further comprises:
    a. generating function heading with correct parameters for said current property;
    b. unpacking model name, class number, function number and parameters of said current property transmitted from said client in response to said clnt_call;
    c. generating code to call a mutator function;
    d. determining if function is an accessor, and if not;
    e. returning to said program at step f of claim 18.

21. A method as in claim 18 wherein said step of generating a C server interface unpacking function for said current operation further comprises:
    a. generating a function heading for said current operation;
    b. declaring a local variable for a return value for said current operation;
    c. determining if said current operation has a return value, and if so;
    d. generating code to set return value for said current operation;
    e. generating a code to call said current operation in C binding;
    f. determining if there are more parameters, and if so;
    g. unpacking a current one of said parameters and pass to C binding call as a parameter;
    h. if there are no more parameters, generating a return of said local variable to said client; and,
    i. returning to step j of claim 18 hereof.

22. A method as in claim 18 wherein said step of generating a function to call an appropriate server unpacking function for type further comprises:
    a. generating a function heading for said function;
    b. generating a switch statement for said function;
    c. for each property of type, determining if a current one of said properties is valid for C binding, and if so;
    d. generating case statements for accessor and mutator functions for said current property;
    e. if there are no more properties for type, for each operation of type, determining if a current one of said operations is valid for C binding, and if so;
    f. generating a case statement for name of said current operation;
    g. if there are no more operations for type, generating case statements for special operations; and,
    h. returning to said program at step l of claim 18 hereof.

23. A method as in claim 15 wherein said step of generating function numbers for said current data type further comprises:
    a. determining if said current data type is not symbolic, and if not:
        i) generating object initializer function numbers for said current data type;
        ii) generating conversion function numbers for said current data type;
    d. determining if said current data type is symbolic, and if so;
    e. generating format and conversion function number;
    f. if said current data type is not symbolic, generating class id and model id function numbers for said current data type; and,
    g. returning to said program at step i of claim 15 hereof.

24. A method as in claim 15 wherein said step of generating C client interface packing functions for said current data type further comprises:
    a. determining if said current data type is not symbolic, and if not:
        i) generating RPC client interface packing object initializer functions;
        ii) generating RPC client interface packing conversion functions;
    b. if said current data type is not not symbolic, determining if said current data type is symbolic, and if so;
    c. generating RPC client interface packing format and conversion functions for said current data type;
    d. if said current data type is not symbolic, generating class id and model id functions for said current data type; and,
    e. returning to said program at step i of claim 15 hereof.

25. A method as in claim 15 wherein said step in said server of generating C server interface unpacking functions for data types further comprises:
    a. determining if said current data type is not symbolic, and if not:
        i) generating RPC server interface unpacking object initializer functions;
        ii) generating RPC server interface unpacking conversion functions;
    b. if said current data type is not not symbolic, determining if said current data type is symbolic, and if so;
    c. generating RPC server interface unpacking format and conversion functions for said current data type;
    d. if said current data type is not symbolic, generating RPC server interface unpacking class id and model id functions for said current data type;
    e. generating a function that makes a switch statement to call an appropriate C server interface unpacking function for said current data type is called; and,
    f. returning to said program at step l of claim 15 hereof.

26. A method as in claim 25 wherein said step of generating a function that makes a switch statement to call an appropriate C server interface unpacking function for said current data type further comprises:
    a. generating a heading for said function;
    b. determining if said current data type is not symbolic, and if not:
        i) generating CASE statements for object initializer functions;
        ii) generating CASE statements for conversion functions;
    c. if said current data type is not not symbolic, determining if said current data type is symbolic, and if so;
        i) generating CASE statements for format;
        ii) generating CASE statements for conversion functions for said current data type;

d. if said current data type is not symbolic, generating CASE statements for class id and model id functions for said current data type; and, e. returning to said program at step e of claim 25 hereof.

27. In a computer system having a server including a CPU, a memory, at least one disk drive and an object-oriented repository, a client remotely located from said server and connected thereto by means of an RPC link, said client including a CPU, a memory, at least one disk drive, and a program operating with said Server for remotely accessing a model stored in said object-oriented repository, said program executing a method for packing and unpacking C functions to and from, respectively, RPC compatible format using RPC protocol, said program comprising the steps of:

a. for each type in said model, determining if a current one of said types is valid for C binding, and if so;

b. generating function numbers for said current type;

c. generating C client interface packing functions for said current type;

d. generating C server interface unpacking functions for said current type;

e. determining if there are more of said types in said model, and if so, repeating steps a through e hereof;

f. if there are no more types, then;

g. for each data type in said model, determining if a current one of said data types is valid for C binding, and if so;

h. generating C function numbers for said current data type;

i. generating C client interface packing functions for said current data type;

j. generating C server interface unpacking functions for said current data type by:
  1) generating RPC server interface unpacking object initializer functions for said current type;
  2) determining if there are more properties for said current type, and if so;
  3) determining if a current property for said current type is valid for C binding, and if so;
  4) generating C server interface unpacking code for accessor functions for said current property;
  5) determining if said current property is not read-only, and if so;
  6) generating C server interface unpacking code for mutator functions for said current property;
  7) if there are no more properties for said current types, determining if there are more operations for said current type, and if so;
  8) determining if a current operation for said current type is valid for C binding, and if so;
  9) resolving operation name for said current operation;
  10) generating a C server interface unpacking function for said current operation;
  11) if there are no more operations for said current type, generating RPC server interface unpacking functions for special operations; and
  12) generating a function such that an appropriate C server interface unpacking function for said current type is called;

k. determining if there are more data types in said model, and if so, repeating steps h through m hereof; and, l. if there are no more data types in said model, stopping said program.

28. In a computer system having a server including a CPU, a memory, at least one disk drive and an object-oriented repository, a client remotely located from said server and connected thereto by means of an RPC link, said client including a CPU, a memory, at least one disk drive, and a program operating with said Server for remotely accessing a model stored in said object-oriented repository, said program executing a method for packing and unpacking C functions to and from, respectively, RPC compatible format using RPC protocol, said program comprising the steps of:

a. for each type in said model, determining if a current one of said types is valid for C binding, and if so;

b. generating function numbers for said current type;

c. generating C client interface packing functions for said current type;

d. generating C server interface unpacking functions for said current type;

e. determining if there are more of said types in said model, and if so, repeating steps a through e hereof;

f. if there are no more types, then;

g. for each data type in said model, determining if a current one of said data types is valid for C binding, and if so;

h. generating C function numbers for said current data type;

i. generating C client interface packing functions for said current data type by:
  1) generating RPC client interface packing object initializer functions for said current type;
  2) determining if there are more properties for said current type, and if so;
  3) for each property for said current type, determining if a current one of said properties is valid for C binding, and if so;
  4) generating C client interface packing code for accessor functions for said current property,
  5) determining if said current property is not read-only, and if so;
  6) generating C client interface packing code for mutator functions for said current property;
  7) if there are no more properties for said type, determining if there are more operations for said type, and if so;
  8) for each operation for said type, determining if a current one of said operations is valid for C binding, and if so;
  9) resolving operation name for said current operation;
  10) generating a C client interface packing function for said current operation;
  11) if there are no more operations for said type, generating an RPC client interface packing function for any special operations;

j. generating C server interface unpacking functions for said current data type;

k. determining if there are more data types in said model, and if so, repeating steps h through m hereof; and, l. if there are no more data types in said model, stopping said program.

29. A method as in claim 28 wherein said step of generating C Client interface packing code for accessor functions for said current property further comprises:

a. generating function heading with correct parameters for said current property;

b. packaging up model name, class number, function number and parameters of said current property into a record;

c. generating code to RPC clnt_call function to initiate a request to said server;
d. generating code for return if RPC call fails;
e. determining if function is an accessor, and if so;
e. generating code to return a value for said accessor; and,
f. returning to said program at step d of claim 28.

30. A method as in claim 28 wherein said step of generating C Client interface packing code for mutator functions for said current property further comprises:
  a. generating function heading with correct parameters for said current property;
  b. packaging up model name, class number, function number and parameters of said current property into a record;
  c. generating code to RPC clnt_call function to initiate a request to said server;
  d. generating code for return if RPC call fails;
  e. determining if function is an accessor, and if not;
  f. returning to said program at step f of claim 28.

31. A method as in claim 28 wherein said step of generating C Client interface packing function for said current operation further comprises:

a. generating function heading with a return type and a parameter list for said operation;
b. determining if there are more parameters, and if so;
c. for each parameter, storing said parameter into a record according to type;
d. when there are no more parameters, generating code to call RPC function clnt_call to initiate a request to said server;
e. determining if said current operation has a return value, and if so;
f. generating code to return with null object if said RPC call fails;
g. if said current operation does not have a return value, generating code to return if said RPC call fails;
h. determining if said current operation returns an object or has parameters that do, and if so;
i. generating code to return a value for said object as requested by said client;
j. returning to said program at step h of claim 28 hereof.

* * * * *